US012652297B2

(12) United States Patent
Murugesan et al.

(10) Patent No.: US 12,652,297 B2
(45) Date of Patent: Jun. 9, 2026

(54) AUTOMATIC RISK REMEDIATION IN MULTI-CLOUD ENVIRONMENT

(71) Applicant: Proofpoint, Inc., Sunnyvale, CA (US)

(72) Inventors: Mummoorthy Murugesan, Gilroy, CA (US); Kapil Rajendra Neeralgi, Bangalore (IN); Ravishankar Ganesh Ithal, Los Altos, CA (US); Abhinav Singh, Sunnyvale, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 18/775,492

(22) Filed: Jul. 17, 2024

(65) Prior Publication Data

US 2025/0039198 A1    Jan. 30, 2025

(30) Foreign Application Priority Data

Jul. 28, 2023    (IN) .............................. 202311051058

(51) Int. Cl.
*H04L 9/40* (2022.01)
(52) U.S. Cl.
CPC ...... *H04L 63/1416* (2013.01); *H04L 63/1433* (2013.01)
(58) Field of Classification Search
None
See application file for complete search history.

(56) References Cited

U.S. PATENT DOCUMENTS 9,516,053 B1 * 12/2016 Muddu ................ G06V 10/225
10,673,880 B1 * 6/2020 Pratt ................... H04L 63/1425

2021/0409441 A1 * 12/2021 Singh .................. H04L 63/1433
2022/0210195 A1 * 6/2022 Parekh .................... H04L 63/20
2022/0294817 A1 * 9/2022 Parekh .................... H04L 67/10
2023/0388352 A1 * 11/2023 Gilad .................. H04L 63/1416
2024/0080329 A1 * 3/2024 Reed ................... G06F 16/9038

FOREIGN PATENT DOCUMENTS

WO    WO-2023150065 A1 *  8/2023 .......... G06F 21/577
WO    WO-2023215491 A1 * 11/2023 .......... G06F 21/577
WO    WO-2024044053 A1 *  2/2024 .......... G06F 9/5077

* cited by examiner

*Primary Examiner* — Joseph P Hirl
*Assistant Examiner* — Hassan Saadoun
(74) *Attorney, Agent, or Firm* — FP Patents; Sikander M. Khan; Chris Volkmann

(57)            ABSTRACT

The technology disclosed relates to analysis of security posture of a cloud environment. In particular, the disclosed technology relates to a system and method of risk event detection and remediation. An event is detected in a cloud environment and a pre-defined risk signature is obtained that identifies one or more entities in the cloud environment and represents an instance of a risk event relative to the one or more entities. The pre-defined risk signature includes a reference to a remediation workflow having one or more commands for one or more remediation actions in the cloud environment. Th pre-defined risk signature is determined to have a threshold match to the event and, based on the determination that the pre-defined risk signature has a threshold match to the event, the remediation workflow is obtained based on the reference. The one or more commands are executed in the cloud environment.

20 Claims, 21 Drawing Sheets

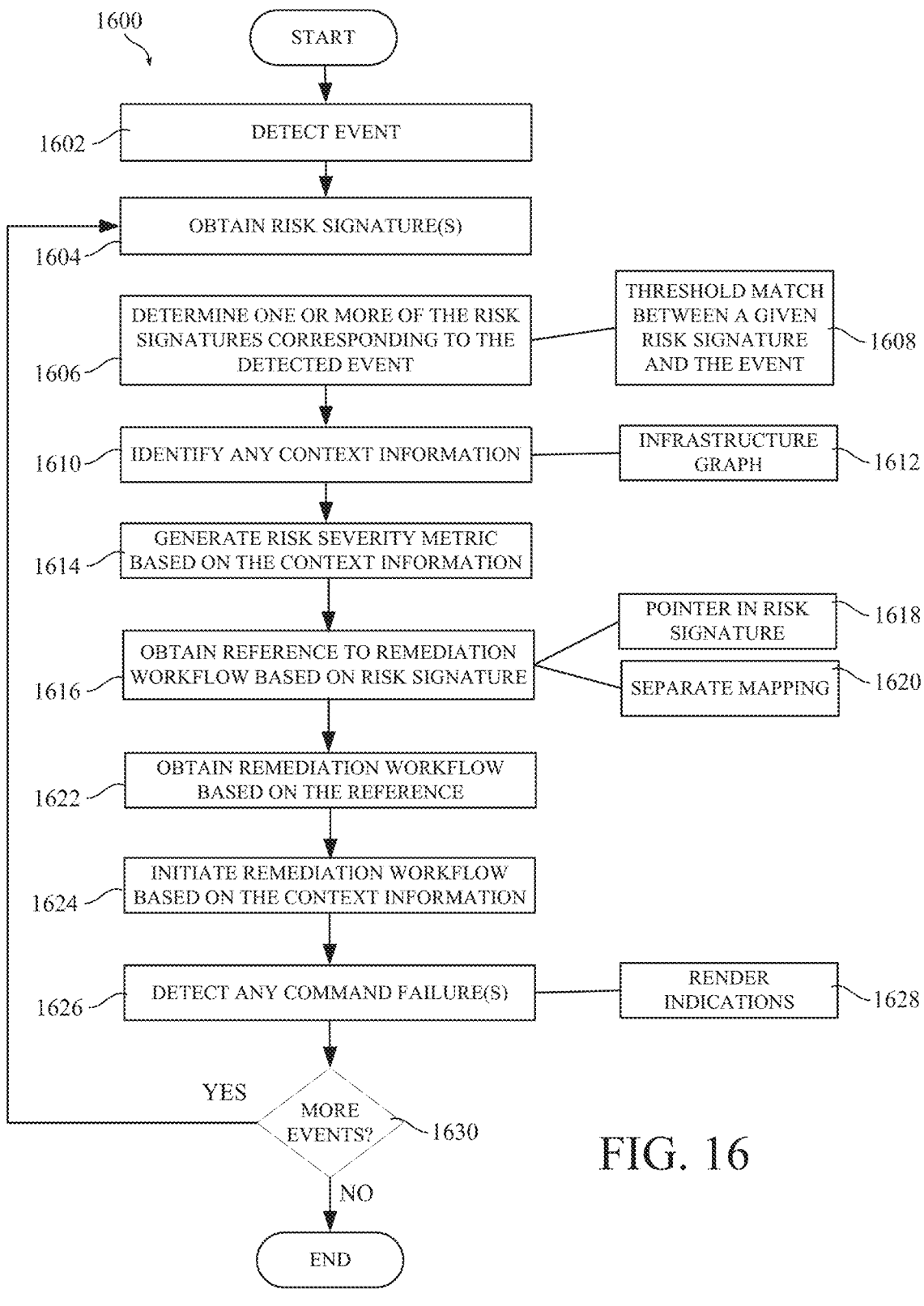

1600

START

1602 — DETECT EVENT

1604 — OBTAIN RISK SIGNATURE(S)

1606 — DETERMINE ONE OR MORE OF THE RISK SIGNATURES CORRESPONDING TO THE DETECTED EVENT

THRESHOLD MATCH BETWEEN A GIVEN RISK SIGNATURE AND THE EVENT — 1608

1610 — IDENTIFY ANY CONTEXT INFORMATION

INFRASTRUCTURE GRAPH — 1612

1614 — GENERATE RISK SEVERITY METRIC BASED ON THE CONTEXT INFORMATION

1616 — OBTAIN REFERENCE TO REMEDIATION WORKFLOW BASED ON RISK SIGNATURE

POINTER IN RISK SIGNATURE — 1618

SEPARATE MAPPING — 1620

1622 — OBTAIN REMEDIATION WORKFLOW BASED ON THE REFERENCE

1624 — INITIATE REMEDIATION WORKFLOW BASED ON THE CONTEXT INFORMATION

1626 — DETECT ANY COMMAND FAILURE(S)

RENDER INDICATIONS — 1628

YES

MORE EVENTS? — 1630

NO

END

AUTOMATIC RISK REMEDIATION IN MULTI-CLOUD ENVIRONMENT

CROSS-REFERENCE TO RELATED APPLICATION

The present application claims the benefit of Indian Application No. 202311051058, filed Jul. 28, 2023, the contents of which is hereby incorporated by reference in its entirety.

FIELD OF THE TECHNOLOGY DISCLOSED

The technology disclosed generally relates to risk remediation in computing environments, such as cloud environments. More specifically, but not by limitation, the present disclosure relates to improved systems and methods of cloud security posture management (CSPM), cloud infrastructure entitlement management (CIEM), cloud-native application protection platform (CNAPP), cloud-native configuration management database (CMDB), and/or data security posture management (DSPM).

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

There are many types of computing environments that provide data storage and/or computing resources for organizations or other end users. Cloud computing, for example, provides on-demand availability of computer resources, such as data storage and compute resources, often without direct active management by users. Thus, a cloud environment can provide computation, software, data access, and storage services that do not require end-user knowledge of the physical location or configuration of the system that delivers the services. In various examples, remote servers can deliver the services over a wide area network, such as the Internet, using appropriate protocols, and those services can be accessed through a web browser or any other computing component.

Examples of cloud storage services include Amazon Web Services™ (AWS), Google Cloud Platform™ (GCP), and Microsoft Azure™, to name a few. Such cloud storage services provide on-demand network access to a shared pool of configurable resources. These resources can include networks, servers, storage, applications, services, etc. The end-users of such cloud services often include organizations that have a need to store sensitive and/or confidential data, such as personal information, financial information, medical information. Such information can be accessed by any of a number of users through permissions and access control data assigned or otherwise defined through administrator accounts.

The discussion above is merely provided for general background information and is not intended to be used as an aid in determining the scope of the claimed subject matter.

SUMMARY

The technology disclosed relates to analysis of security posture of a cloud environment. In particular, the disclosed technology relates to a system and method of risk event detection and remediation. An event is detected in a cloud environment and a pre-defined risk signature is obtained that identifies one or more entities in the cloud environment and represents an instance of a risk event relative to the one or more entities. The pre-defined risk signature includes a reference to a remediation workflow having one or more commands for one or more remediation actions in the cloud environment. Th pre-defined risk signature is determined to have a threshold match to the event and, based on the determination that the pre-defined risk signature has a threshold match to the event, the remediation workflow is obtained based on the reference. The one or more commands are executed in the cloud environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

3

4

FIG. 16 is a flow diagram illustrating an example operation of initiation a remediation workflow for a detected event.

Figure 17:
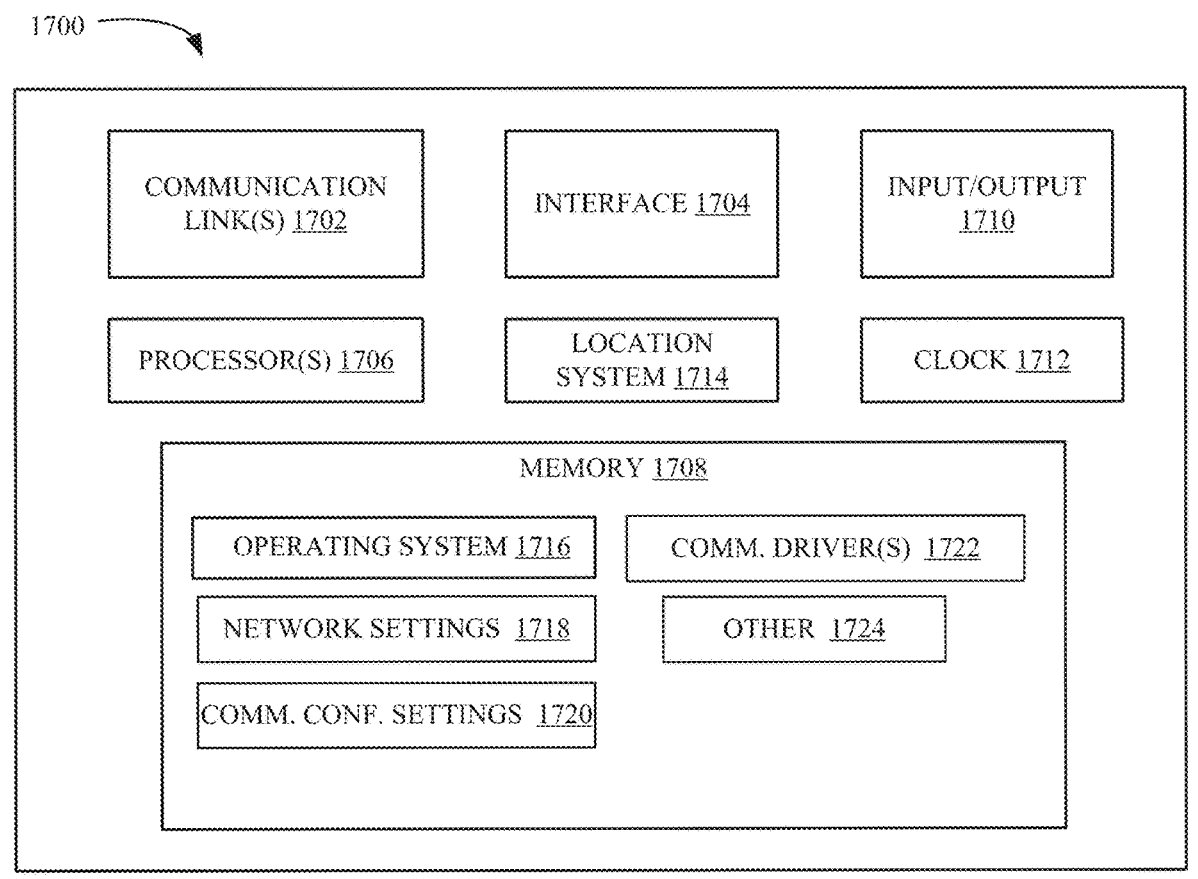

FIG. 17 is a simplified block diagram of one example of a client device.

Figure 18:
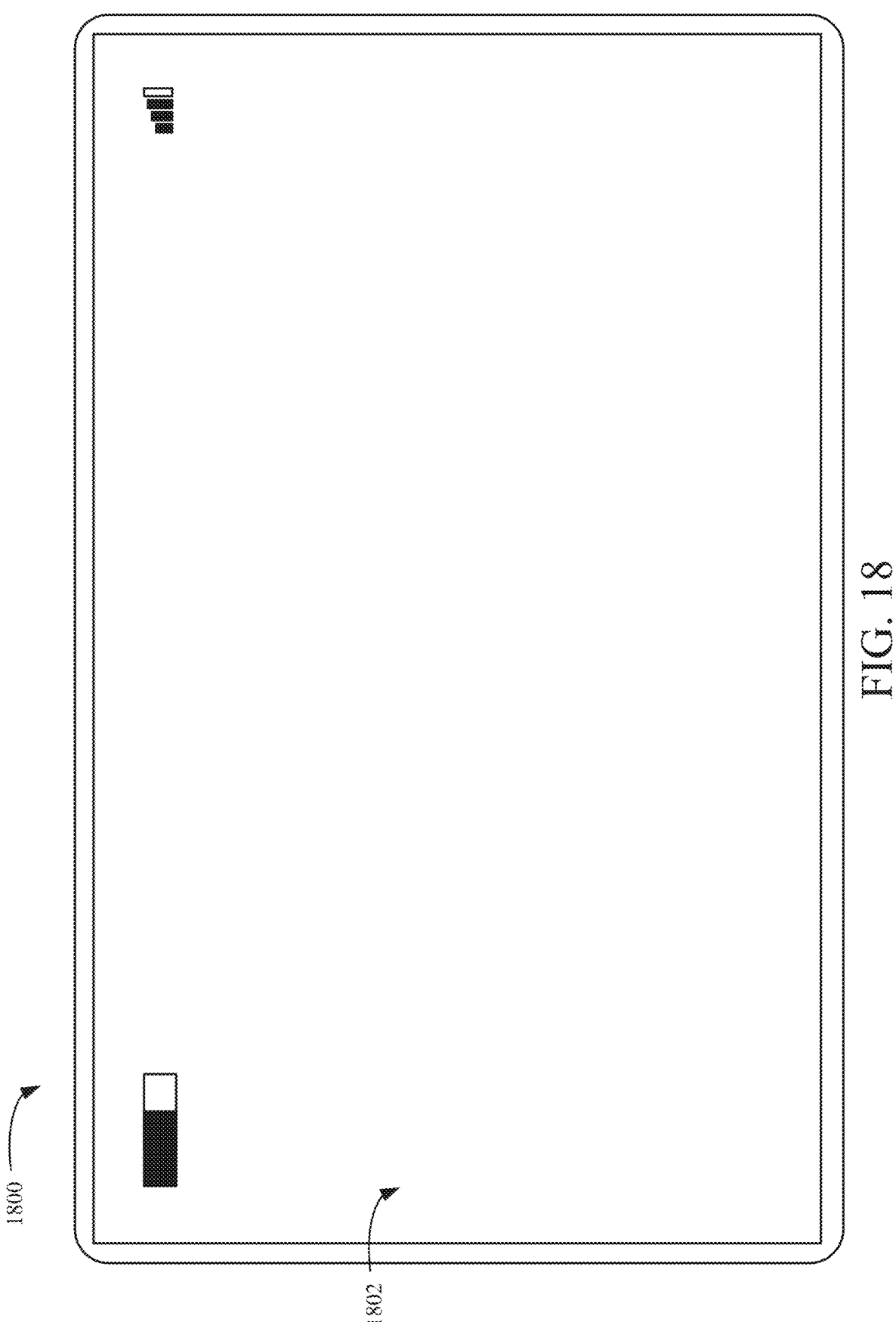

FIG. 18 illustrates an example of a handheld or mobile device.

Figure 19:
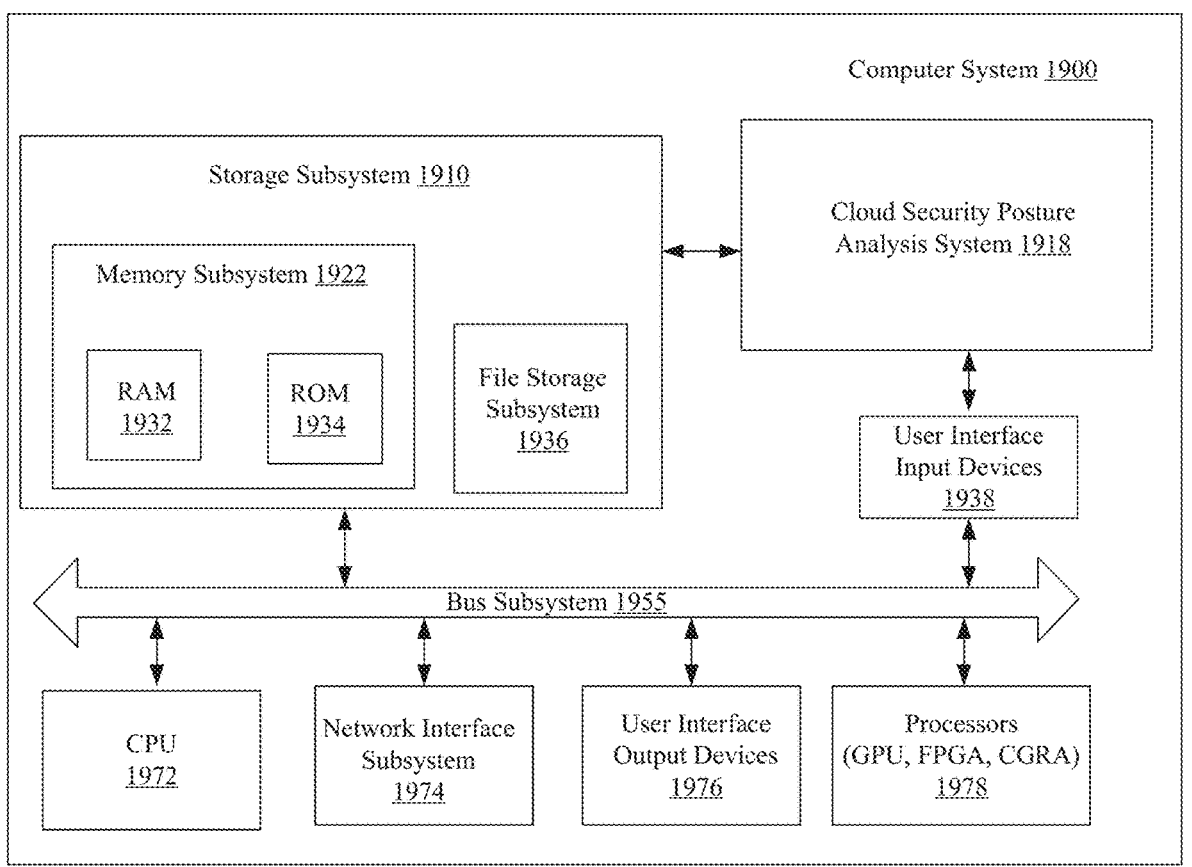

FIG. 19 shows an example computer system.

DETAILED DESCRIPTION

The following discussion is presented to enable any person skilled in the art to make and use the technology disclosed, and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein.

As noted above, cloud computing environments are used by organizations or other end-users to store a wide variety of different types of information in many contexts and for many uses. This data can often include sensitive and/or confidential information, and can be the target for malicious activity such as acts of fraud, privacy breaches, data theft, etc. These risks can arise from individuals that are both inside the organization as well as outside the organization.

Cloud environments often include security infrastructure to enforce access control, data loss prevention, or other processes to secure data from potential vulnerabilities. However, even with such security infrastructures, it can be difficult for an organization to understand the data posture and breadth of access to the data stored in the cloud in the organization's cloud account. In other words, it can be difficult to identify which users have access to which data, and which data may be exposed to malicious or otherwise unauthorized users, both inside or outside the organization.

The present disclosure is directed to a cloud security posture analysis system. In some described examples, a system and/or method that detects an event in a cloud environment, identifies a pre-defined risk signature having a threshold match to the event, the pre-defined risk signature having a pointer to a remediation workflow, identifies context information based an infrastructure graph, and executes the remediation workflow with an input condition that is based on the context information.

Some examples below are described in the context of a multi-cloud environment, in which a number of cloud services or accounts reside on different cloud service providers. However, it is noted that these descriptions are for sake of example and the described features and concepts are not limited to multi-cloud environments.

In a multi-cloud example, the system is cloud service provider agnostic. The system is accessible by each cloud service, regardless of which cloud service provider the cloud service is in, to map risk signatures to remediation workflows defined in terms of cloud-provider specific commands. The system is further extensible as additional commands and/or risk signatures are added.

Figure 1:
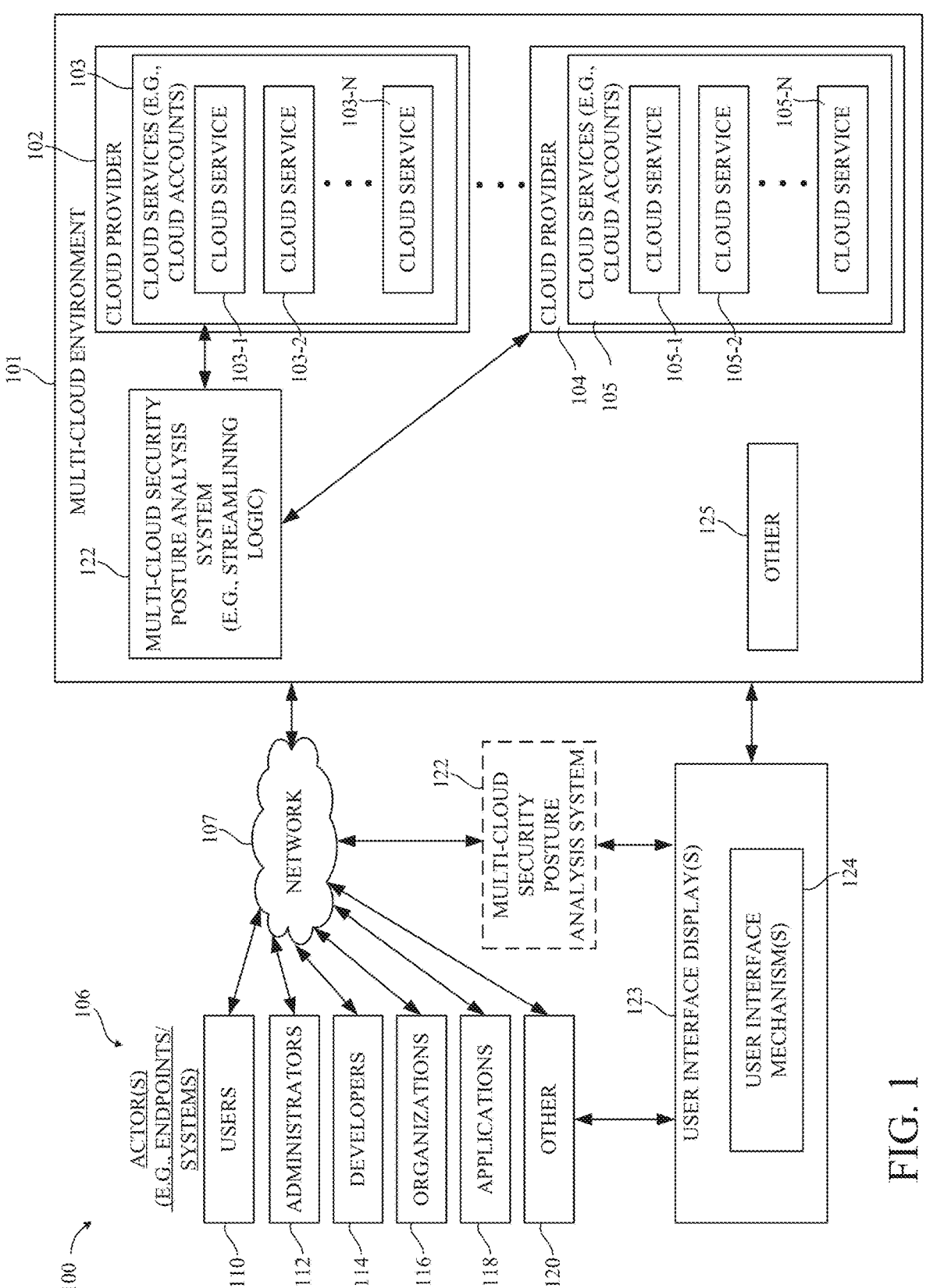
FIG. 1 is a block diagram illustrating one example of a cloud architecture.

FIG. 1 is a block diagram illustrating one example of a cloud architecture 100 in which a cloud environment 101 is accessed by one or more actors 106 through a network 107, such as the Internet or other wide area network. Cloud environment 101 is illustratively a multi-cloud environment (also referred to herein as multi-cloud environment 101) in which multiple different cloud providers (e.g., cloud service providers (CSPs) provide cloud services.

As shown, a first cloud provider 102 includes one or more cloud services 103-1, 103-2, 103-N, collectively referred to as cloud services 103. As noted above, cloud provider 102 can include a cloud provider such as, but not limited to, AWS, GCP, Azure, to name a few.

Cloud services 103-1, 103-2, 103-N can include the same type of cloud service, or can be different types of cloud services, and can be accessed by any of a number of different actors 106. For example, as illustrated in FIG. 1, actors 106 include users 110, administrators 112, developers 114, organizations 116, and/or applications 118. Of course, other actors 120 can access cloud environment 101 as well.

A second cloud provider 104 includes one or more cloud services 105-1, 105-2, 105-N, collectively referred to as cloud services 105. In a multi-cloud environment, cloud provider 104 can be different than cloud provider 102 (e.g., AWS and GCP etc.).

Architecture 100 includes a cloud security posture analysis system 122 configured to access cloud services to identify and analyze cloud infrastructure and data security posture within cloud environment. Cloud security posture analysis system 122 is considered a multi-cloud security posture analysis system (also referred to herein as multi-cloud security posture analysis system 122) is configured to analyze cloud services across multiple different cloud service providers. In this way, system 122 is service provider agnostic, and is configured to interact with the different cloud provider specific interfaces and policies.

Examples of system 122 are discussed in further detail below. Briefly, however, system 122 is configured to access cloud services 103 and identify cloud infrastructure assets, such as by identifying connected resources, entities, actors, etc. within those cloud services, and to identify risks and violations against access to sensitive information. As shown in FIG. 1, system 122 can reside within cloud environment 101 or outside cloud environment 101, as represented by the dashed box in FIG. 1. Of course, system 122 can be distributed across multiple items inside and/or outside cloud environment 101.

Users 110, administrators 112, developers 114, or any other actors 106, can interact with cloud environment 101 through user interface displays 123 having user interface mechanisms 124. For example, a user can interact with user interface displays 123 provided on a user device (such as a mobile device, a laptop computer, a desktop computer, etc.) either directly or over network 107. Cloud environment 101 can include other items 125 as well.

Figure 2:
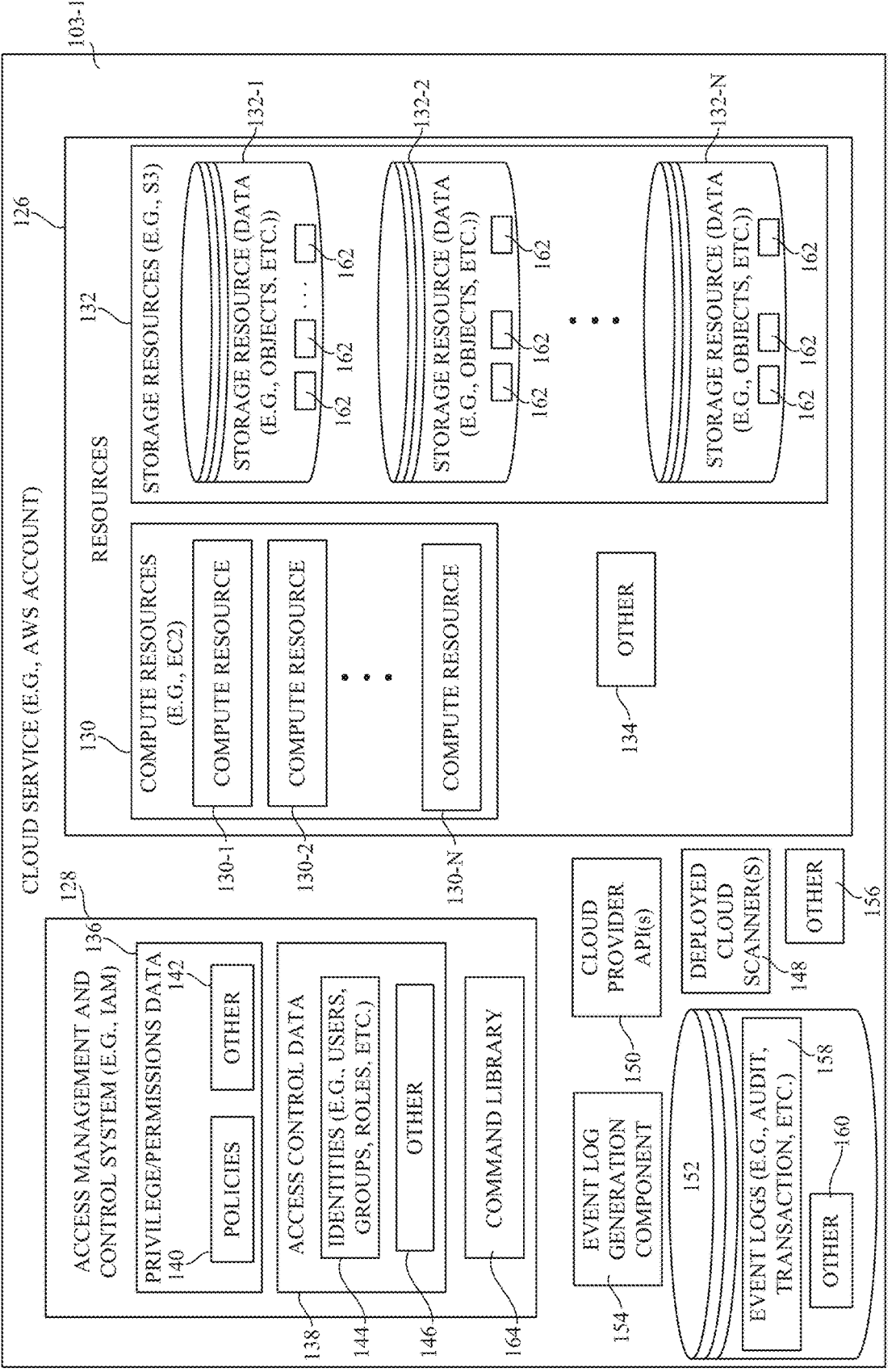
FIG. 2 is a block diagram illustrating one example of a cloud service.

FIG. 2 is a block diagram illustrating one example of cloud service 103-1. For the sake of the present discussion, but not by limitation, cloud service 103-1 will be discussed in the context of an account within AWS. Of course, other types of cloud services and providers are within the scope of the present disclosure.

Cloud service 103-1 includes a plurality of resources 126 and an access management and control system 128 configured to manage and control access to resources 126 by actors 106. Resources 126 include compute resources 130, storage resources 132, and can include other resources 134. Compute resources 130 include a plurality of individual compute resources 130-1, 130-2, 130-N, which can be the same and/or different types of compute resources. In the present example, compute resources 130 can include elastic compute resources, such as elastic compute cloud (AWS EC2) resources, AWS Lambda, etc.

An elastic compute cloud (EC2) is a cloud computing service designed to provide virtual machines called instances, where users can select an instance with a desired amount of computing resources, such as the number and type of CPUs, memory and local storage. An EC2 resource allows users to create and run compute instances on AWS, and can use familiar operating systems like Linux, Windows, etc. Users can select an instance type based on the memory and computing requirements needed for the application or software to be run on the instance.

AWS Lambda is an event-based service that delivers short-term compute capabilities and is designed to run code without the need to deploy, use or manage virtual machine instances. An example implementation is used by an organization to address specific triggers or events, such as database updates, storage changes or custom events generated from other applications. Such a compute resource can include a server-less, event-driven compute service that allows a user to run code for many different types of applications or backend services without provisioning or managing servers.

Storage resources 132 are accessible through compute resources 130, and can include a plurality of storage resources 132-1, 132-2, 132-N, which can be the same and/or different types of storage resources. A storage resource 132 can be defined based on object storage. For example, AWS Simple Storage Service (S3) provides highly-scalable cloud object storage with a simple web service interface. An S3 object can contain both data and metadata, and objects can reside in containers called buckets. Each bucket can be identified by a unique user-specified key or file name. A bucket can be a simple flat folder without a file system hierarchy. A bucket can be viewed as a container (e.g., folder) for objects (e.g., files) stored in the S3 storage resource.

Compute resources 130 can access or otherwise interact with storage resources 132 through network communication paths based on privileges/permissions data 136 and/or access control data 138. System 128 illustratively includes identity and access management (IAM) functionality that controls access to cloud service 103-1 using entities (e.g., IAM entities) provided by the cloud computing platform.

Privileges/permissions data 136 includes policies 140 and can include other data 142 defining permissions and/or privileges. For purposes of some examples discussed herein, the terms "privileges" and "permissions" will be used interchangeably. An example privilege includes a property of an agent, such as a user or resource, that allows the agent to perform an action not ordinarily allowed. Another example includes a property of an object, such as a file and defines which agents are permitted to use the object, and what the agent is permitted to do (read, write, modify, etc.).

Access control data 138 includes identities 144 and can include other access control data 146 as well. Examples of identities 144 include, but are not limited to, users, groups, roles, etc. In AWS, for example, an IAM user is an entity that is created in the AWS service and represents a person or service who uses the IAM user to interact with the cloud service. An IAM user provides the ability to sign into the AWS management console for interactive tasks and to make programmatic requests to AWS services using the API, and includes a name, password, and access keys to be used with the API. Permissions can be granted to the IAM user to make the IAM user a member of a user group with attached permission policies. An IAM user group is a collection of IAM users with specified permissions. Use of IAM groups can make management of permissions easier for those users. An IAM role in AWS is an IAM identity that has specific permissions, and has some similarities to an IAM user in that the IAM role is an AWS identity with permission policies that determine what the identity can and cannot do in AWS. However, instead of being uniquely associated with one person, a role is intended to be assumable by anyone who needs it. Roles can be used to delegate access to users, applications, and/or services that don't normally have access to the AWS resources. Roles can be used by IAM users in a same AWS account and/or in different AWS accounts than the role. Also, roles can be used by compute resources 130, such as EC2 resources. A service role is a role assumed by a service to perform actions in an account on behalf of a user. Service roles include permissions required for the service to access the resources needed by the service. Service roles can vary from service to service. A service role for an EC2 instance, for example, is a special type of service role that an application running on an EC2 instance can assume to perform actions.

Policies 140 can include identity-based policies that are attached to IAM identities can grant permissions to the identity. Policies 140 can also include resource-based policies that are attached to resources 126. Examples include S3 bucket policies and IAM role trust policies. An example trust policy includes a JSON policy document that defines the principles that are trusted to assume a role. In AWS, a policy is an object that, when associated with an identity or resource, defines permissions of the identity or resource. AWS evaluates these policies when an IAM principal user or a role) makes a request. Permissions in the policy determine whether the request is allowed or denied. Policies are often stored as JSON documents that are attached to the IAM identities (user, groups of users, role).

A permissions boundary is a managed policy for an IAM identity that defines the maximum permissions that the identity-based policies can grant to an entity, but does not grant the permissions. Further, access control lists (ACLs) control which principles in other accounts can access the resource to which the ACL is attached. ACLs can be similar to resource-based policies. In some implementations of the technology disclosed, the terms "roles" and "policies" are used interchangeably.

Cloud service 103-1 includes one or more deployed cloud scanners 148, cloud provider application programming interface(s) (APIs) 150, a data store 152, an event log generation component 154, and can include other items 156 as well. Cloud scanner 148 run locally on the cloud-based services and the server systems, and can utilize elastic compute resources, such as, but not limited to, AWS Lambda resources. Cloud scanner 148 is configured to access and scan the cloud service 103-1 on which the scanner is deployed. Examples are discussed in further detail below. Briefly, however, a scanner accesses the data stored in storage resources 132, privileges/permissions data 136, and access control data 138 to identify particular data patterns (such as, but not limited to, sensitive string patterns) and traverse or trace network communication paths between pairs of compute resources 130 and storage resources 132. The results of the scanner can be utilized to identify subject vulnerabilities, such as resources vulnerable to a breach attack, and to construct a cloud attack surface graph or other data structure that depicts propagation of a breach attack along the network communication paths.

Given a graph of connected resources, such as compute resources 130, storage resources 132, etc., entities (e.g., accounts, roles, policies, etc.), and actors (e.g., users, administrators, etc.), risks and violations against access to sensitive information is identified. A directional graph can be built to capture nodes that represent the resources and labels that are assigned for search and retrieval purposes. For example, a label can mark the node as a database or S3 resource, actors as users, administrators, developers, etc. Relationships between the nodes are created using information available from the cloud infrastructure configuration. For example, using the configuration information, system 122 can determine that a resource belongs to a given account and create a relationship between the policy attached to a resource and/or identify the roles that can be taken up by a user.

Event log generation component 154 is configured to generate event logs 158 (also referred to as activity logs), which record actions taken by a user, a role, or a cloud service as events. Component 154, in one example, is configured to deploy a database log generator on each of a plurality of databases 162 on storage resources 132. Databases 162 can store information in any of a plurality of different types of structures. For example, some or all databases 162 can comprise structured query language (SQL) databases that store and organize data in tables with related information. Each table consists of rows and columns, with each row representing a record and each column representing a specific data field. SQL databases allow users to manipulate data through SQL commands. Some examples of SQL databases include MySQL and PostgreSQL, to name a few. Alternatively, or in addition, some or all databases 162 can include non-SQL databases.

The respective event log generator, for each respective database 162, generates a respective database log in event logs 158. An example log includes log entries that record the database activities, events, etc. Example logs include, but not limited to, audit logs, transaction logs, etc.

As noted above, in some examples, resources 126 can include AWS EC2 and/or Lambda resources. Also, resources 126 can include AWS Instance Stores and/or AWS Elastic Block Store (EBS) volumes. An EBS volume is a durable, block-level storage device that can attach to a compute instance and used as a physical hard drive.

Resources 126 can also include an Azure blob identified by a resource URL syntax that assigns each resource a corresponding base URL.

A cloud storage service or cloud service provider (CSP) can include an organization which hosts services such as networking, software, servers, and/or infrastructure, among others. A CSP can also provide security for the provided services. The services provided by the CSP can relieve a client organization of individual responsibility of setting and managing infrastructure. Examples of CSPs include Amazon Web Services™, Microsoft Azure™, Salesforce™, Google Cloud Platform™, among others.

Cloud provider APIs 150 are configured to receive calls to access various components in cloud service 103. For example, cloud provider APIs 150 can access event logs 158 stored in data store 152. Data store 152 can also store other data items 160 as well.

A CSP generally provides a number of different interfaces to cloud-computing services, such as a service-provider interface to organizational clients for computing services. A CSP, for example, provides interfaces that allow cloud-computing clients to launch virtual machines, application programs, and other computational entities. A CSP can also provide user interface that allow claims to access, through the Internet, the services provided by the CSP. A client of the CSP can deploy web servers to access, modify, and sending information.

A cloud account provided by a CSP includes roles that determine user privileges users and what actions can be taken in the cloud account. An identify and access management (IAM) role is managed by the CSP and provides predefined roles that give granular access to specific CSP resources and prevent unwanted access to other CSP resources. For instance, an AWS IAM role includes an AWS identity with a set of permissions policies that each determine what the role can do within an AWS account. An IAM role can be assumed by anyone who needs requires the role.

Cloud service 103-1 includes a command library 164. Command library 164 is a collection of commands and defines, for each command, what input(s) are required for execution of that command. Examples of commands include removing public access to a service, quarantining a resource, moving files, deleting files, etc. Illustratively, command library 164 includes commands that are specific to the cloud provide 102, 104 within which the cloud service resides. In this manner, and as discussed in further detail below, in described examples risk event detection and remediation is performed in a multi-cloud environment using tools, interfaces, and other functionality that is cloud service provider agnostic, but utilizes cloud provider-specific commands that can be mapped to risk signatures, which can also be specific to the cloud provider environment.

Figure 3:
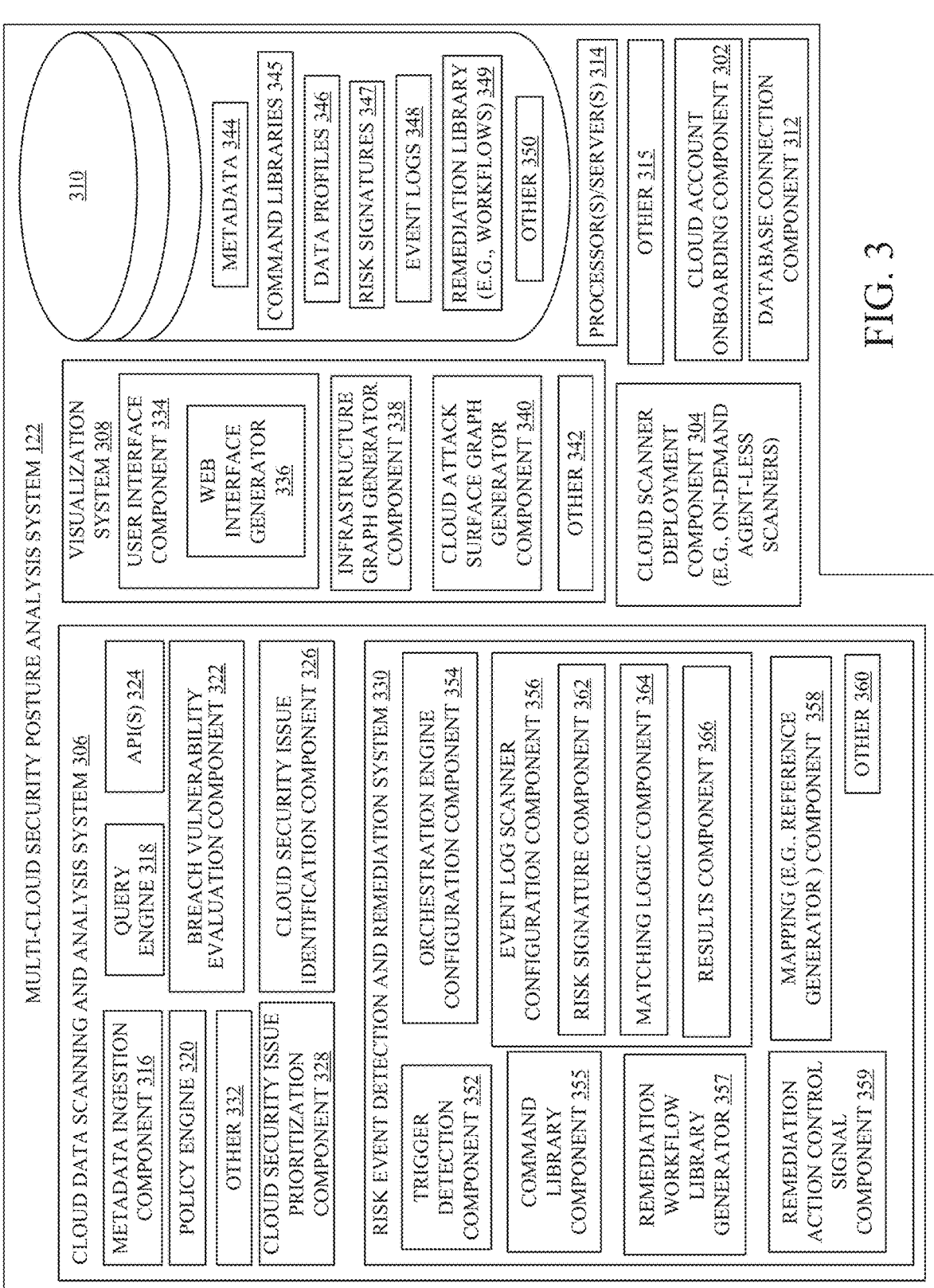
FIG. 3 is a block diagram illustrating one example of a cloud security posture analysis system.

FIG. 3 is a block diagram illustrating one example of cloud security posture analysis system 122. As noted above, system 122 can be deployed in cloud environment 101 and/or access cloud environment 101 through network 107 shown in FIG. 1.

System 122 includes a cloud account onboarding component 302, a cloud scanner deployment component 304, a cloud data scanning and analysis system 306, a visualization system 308, and a data store 310. System 122 can also include a database connection component 312, one or more processors or servers 314, and can include other items 315 as well.

Cloud account onboarding component 302 is configured to onboard cloud services 103,105 for analysis by system 122. After onboarding, cloud scanner deployment component 304 is configured to deploy a cloud scanner (e.g., deployed cloud scanner(s) 148 shown in FIG. 2) to each of one or more of the cloud services 103,105. In one example, the deployed scanners are on-demand agent-less scanners configured to perform agent-less scanning within the cloud service. One example of an agent-less scanner does not require agents to be installed on each specific device or machine. The scanners operate on resources 126 and access management and control system 128 directly within the cloud service, and generate metadata that is returned to system 122. Thus, in one example, the actual cloud service data is not required to leave the cloud service for analysis.

Cloud data scanning and analysis system 306 includes a metadata ingestion component 316 configured to receive the metadata generated by the deployed cloud scanner(s) 148. System 306 also includes a query engine 318, a policy engine 320, a breach vulnerability evaluation component 322, one or more application programming interfaces (APIs) 324, a cloud security issue identification component 326, a cloud security issue prioritization component 328, a risk event detection and remediation system 330, and can include other items 332 as well.

Query engine 318 is configured to execute queries against the received metadata and generated cloud security issue data. Policy engine 320 can execute security policies against the cloud data and breach vulnerability evaluation component 322 is configured to evaluate potential breach vulnerabilities in the cloud service. APIs 324 are exposed to users, such as administrators, to interact with system 122 to access the cloud security posture data.

Component 326 is configured to identify cloud security issues and component 328 can prioritize the identified cloud security issues based on any of a number of criteria.

Visualization system 308 is configured to generate visualizations of the cloud security posture from system 306. Illustratively, system 308 includes a user interface component 334 configured to generate a user interface for a user, such as an administrator. In the illustrated example, component 334 includes a web interface generator 336 configured to generate web interfaces that can be displayed in a web browser on a client device.

Visualization system 308 also includes an infrastructure graph generator component 338, a cloud attack surface graph generator component 340, and can include other items 342 as well. Infrastructure graph generator component 338 is configured to generate a graph or other representation of the relationships between resources 126 or other infrastructure assets such as privileges, roles, etc. For example, component 338 can generate a cloud infrastructure graph, such as a map, that graphically depicts pairs of compute resources and storage resources as nodes and network communication paths as edges between the nodes.

Cloud attack surface graph generator component 340 is configured to generate a surface graph or other representation of vulnerabilities of resources to a breach attack. In one example, the representation of vulnerabilities can include a cloud attack surface map that graphically depicts propagation of a breach attack along network communication paths as edges between nodes that represent the corresponding resources.

Data store 310 stores metadata 344 obtained by metadata ingestion component 316, command libraries 345, sensitive data profiles 346, risk signatures 347, detected event logs 348, a remediation library 349, and can store other items 350 as well. Examples of sensitive data profiles 346 are discussed in further detail below. Briefly, however, sensitive data profiles 346 can identify target data patterns that are to be categorized as sensitive or conforming to a predefined pattern of interest. Sensitive data profiles 346 can be used as training data for data classification. Examples of data classification are discussed in further detail below. For instance, however, pattern matching can be performed based on the target data profiles. Illustratively, pattern matching can be performed to identify instances of data patterns corresponding to social security numbers, credit card numbers, other personal data, medical information, to name a few. In one example, artificial intelligence (AI) is utilized to perform named entity recognition (e.g., natural language processing modules can identify sensitive data, in various languages, representing names, company names, locations, etc.).

Database connection component 312 is configured to connect to, or access, databases in the data stores of the resources being analyzed by system 122. Examples are discussed in further detail below. Briefly, however, database connection component 312 can receive user access credentials, such as a username and password, for each database of a plurality of databases to be accessed in the cloud environment and scanned by the deployed scanners. In another example, database connection component 312 can be configured to connect to representations of the databases that are accessed using a different authentication requirement, than the databases themselves. For example, database connection component 312 can identify and connect to snapshots of the databases through cloud provider APIs 150, discussed above. Database connection component 312 can access event logs 158, for the identified databases, from data store 152.

Risk event detection and remediation system 330 includes a trigger detection component 352, an orchestration engine configuration component 354, a command library component 355, an event log scanner configuration component 356, a remediation workflow library generator 357, a mapping component 358, a remediation action control signal component 359, and can include other items 360 as well.

Operation of system 330 is discussed in further detail below. Briefly, however, trigger detection component 352 is configured to detect a triggering criterion corresponding to initiation of risk event detection of cloud environment 101. For example, the risk event detection can be initiated for one or more cloud accounts associated with a given user.

Orchestration engine configuration component 354 configures an orchestration engine (e.g., a control plane) that is configured to deploy configured event log scanners to the cloud account(s) to scan event logs in those accounts. For example, the orchestration engine can deploy a plurality of microservices to analyze event logs in parallel. Examples of event logs include, but are not limited to, database activity logs.

An example orchestration engine includes a tool or platform that automates and manages the deployment, configuration, coordination, and monitoring of complex applications or services. The orchestration engine can provide a centralized control system that streamlines the management of multiple components and resources, such as containerized applications, across distributed systems. In addition, the orchestration engine can include features such as load balancing, automatic failover, and resource allocation to help ensure that the application is highly available and can scale dynamically to handle changing workloads. In one example, each microservice is configured to perform a specific function that is deployable and scalable independently of other services. The deployed log analyzer microservice(s) return analysis results to the orchestration engine, such as in the form of metadata form the event logs.

Command library component 355 is configured to obtain command libraries (e.g., command library 164) for each cloud provider 102, 104. The command libraries can be stored in data store 310, as command libraries 345. Thus, command libraries 345 can include a command library that is specific to each cloud provider in multi-cloud environment 101.

Event logs scanner configuration component 356 includes a risk signature component 362, a matching logic component 364, and a results component 366. Risk signature component 362 is configured to obtain a set of risk signatures and to generate metadata representing those risk signatures, as inputs to the event log scanners to be used as criterion for the matching logic (e.g., a rules engine) to parse the event logs for risky events (candidate risk events that have some threshold correspondence to the risk signatures). Examples of inputs include cloud provider identification (e.g., AWS, etc.), asset/service type (e.g., S3, RDS, IAM, etc.), and/or operations or actions of interest that occur within the cloud environment and are to be identified as candidate risk events. An example of metadata generated for a risk signature indicates an RDS service (i.e., asset type) with a sharing operation (i.e., target action).

An event log scanner configured by component 356 is configured to detect, in the cloud environment, instances of the candidate risk events in accordance with the risk signature definitions and to label each detected instance with a signature identifier that identifies one or more risk signatures, of the set of risk signatures identified by component 362, that correspond to the detected instance. The scanner generates result metadata indicative of the detected instances of candidate risk events that is returned using results component 366.

Remediation workflow library generator 357 is configured to generate remediation library 349, for example based on user input through a user interface generated by component 334. Remediation library 349 includes a plurality remediation workflows generated by generator 357, each workflow comprises a set of commands from command library 164 and the inputs in the form of logical workflows.

In one example, a workflow includes a series of tasks or activities that are part of a larger process, and can define the sequence of steps or action to complete a particular goal or objective. Some components of a workflow can include, but are not limited to, a workflow order, task dependencies, roles and/or responsibilities, inputs and/or outputs, decision points, feedback and/or iteration, and failure logic. A workflow order defines the order a sequence of tasks are to be performed. Task dependences define tasks that depend on the completion of other tasks before the tasks can begin. Roles and/or responsibilities specify which entity is responsible for each task or activity. Inputs and/or outputs specify, for each task, certain required inputs and specific outputs that reproduced. Decision points identify where the flow of tasks can diverge based on certain conditions. Failure logic defines a set of rules and/or actions used to handle and respond to failures or errors that occur within the workflow.

An example remediation workflow includes a metacommand. A metacommand includes a command or instruction that controls or alters the behavior of other commands or functions within a system or program. A metacommand can be viewed as a higher-level command that operates on the commands themselves rather than directly manipulating data or performing specific tasks. Metacommands can be used in computing contexts, such as in command-line interfaces or programming languages, to streamline operations, automate tasks, or modify program behavior, and can include commands for scripting, debugging, or managing resources.

Accordingly, an example remediation workflow includes a set of commands executed in response to a detected risk, by identifying and providing inputs for those commands based on context information or other data identified from the detected risk. The commands within the remediation workflow can be interconnected, e.g., an output from the action of one command is provided as an input to another command. The commands can depend from one another, in that one command must execute successfully before performance of a second command. Further, system 122 is configured to identify individual commands that fail during execution of a remediation workflow. Further yet, and as discussed in further detail below, a remediation workflow can include conditional inputs, such as risk severity and infrastructure context, that are provided for execution of the commands within the remediation workflow. For sake of illustration, but not by limitation, for a given remediation workflow, if a risk event is detected with a low severity, a subset of the commands can be executed from the remediation workflow, whereas if a risk event is determined to have a high severity, all of the commands from the remediation workflow are executed. Further yet, the infrastructure context can indicate that the risk involved sensitive data so different commands from the remediation workflow are executed, compared to if the detected risk did not involve sensitive data. These, of course, are for sake of illustration only.

Mapping component 358 is configured to generate mappings between risk signatures 347 and remediation workflows in remediation library 349, and can take a variety of different forms. An example mapping includes a reference, such as a pointer, that is created in or otherwise associated with a given risk signature. The reference identifies one or more of the remediation workflows. In this way, the remediation workflow(s) identified by the reference can be automatically identified and/or executed by remediation action control signal component 359 based on the results metadata. For example, remediation action control signal component 359 can perform post-processing that obtains context information based on the result metadata, for example from an infrastructure graph. In another example, a user interface display is generated to indicate detected risk events and/or perform remedial actions based on the risk events, etc.

Examples of the pointer include, but are not limited to, a Uniform Resource Identifiers (URI), a Uniform Resource Locator (URL), etc. For instance, a URL can point to a URL can point to a specific step in a workflow. Also, a URL can act as a pointer to an API endpoints and/or a task in a task management system.

Figure 4:
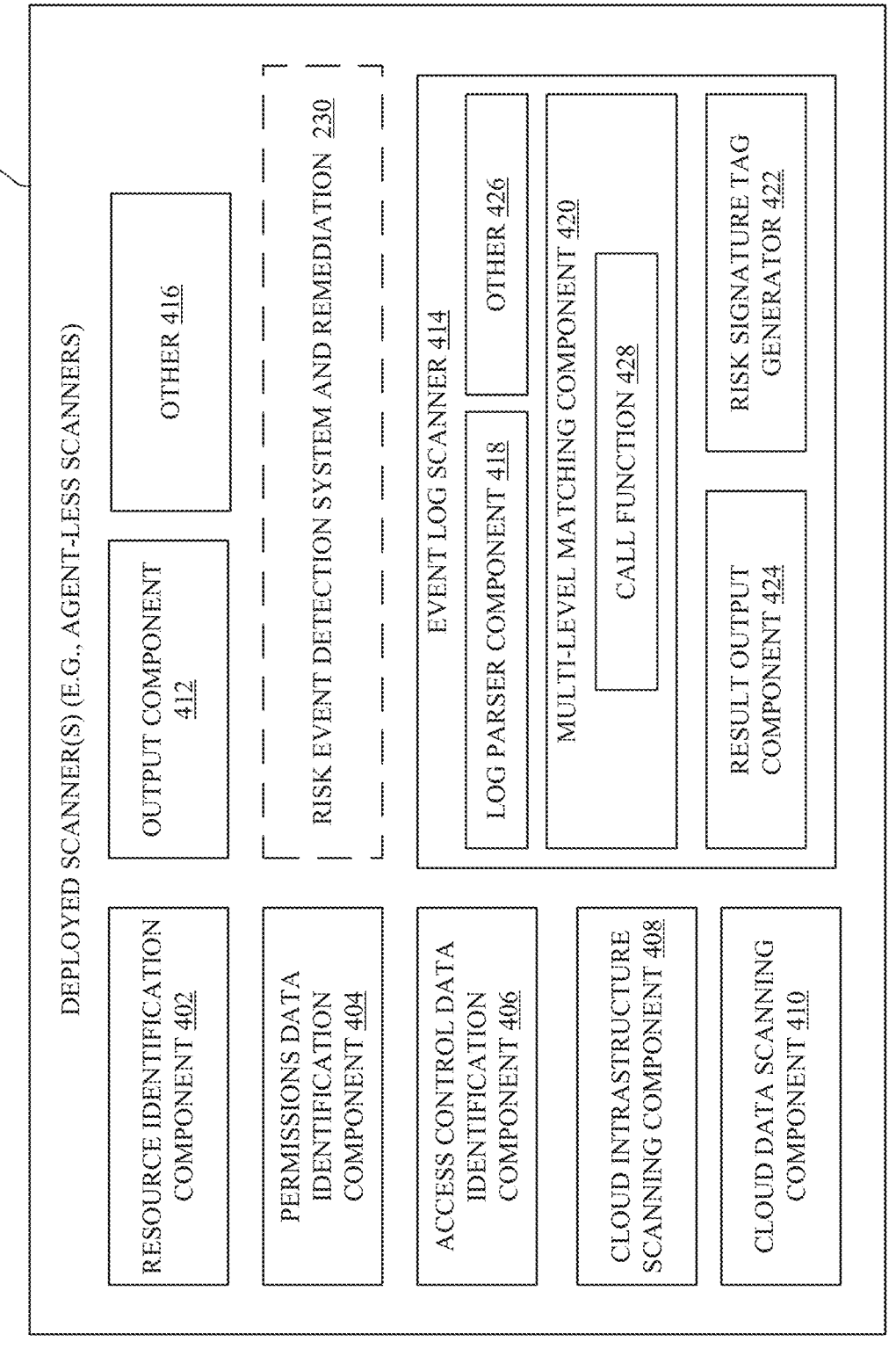
FIG. 4 is a block diagram illustrating one example of a deployed scanner.

FIG. 4 is a block diagram illustrating one example of a deployed scanner 148. Scanner 148 includes a resource identification component 402, a permissions data identification component 404, an access control data identification component 406, a cloud infrastructure scanning component 408, a cloud data scanning component 410, an output component 412, an event log scanner component 414, and can include other items 416 as well. FIG. 4 also illustrates that some or all components of and/or functionality performed by system 330 can be on or otherwise associated with deployed scanner 148.

Resource identification component 402 is configured to identify the resources 126 within cloud service 103-1 (and/or other cloud services 103, 105) and to generate corresponding metadata that identifies these resources. Permissions data identification component 404 identifies the permissions data 136 and access control data identification component 406 identifies access control data 138. Cloud infrastructure scanning component 408 scans the infrastructure of cloud service 103-1 to identify the relationships between resources 130 and 132 and cloud data scanning component 410 scans the actual data stored in storage resources 132. Output component 412 is configured to output the generated metadata and content-based classification results to cloud security posture analysis system 122.

The metadata generated by scanner 148 can indicate a structure of schema objects in a data store. For example, where the schema objects comprise columns in a data store having a tabular format, the returned metadata can include column names from those columns. A content-based data item classifier is configured to classify data items within the schema objects, based on content of those data items. Examples are discussed in further detail below.

Event log scanner component 414 is configured to analyze event log(s) to identify candidate risk events. An example candidate risk event includes an event that has a threshold level of matching to a predefined risk signature. For example, a candidate risk event can include an RDS service having a sharing operation. As discussed in further detail below, post-processing operations can determine, using context information, whether the candidate risk event is considered an actual risk event. For sake of illustration, in the above example of a detected event of an RDS service with a sharing operation, the context information can indicate whether the RDS service includes sensitive data and/or the sharing operation shared data with a publicly accessible resource, etc. Put another way, the additional post-processing steps are utilized to determine whether some or all of the candidate risk events are identified as actual risk events based on the risk signatures (or can be discarded as false risk events) and/or whether to perform subsequent actions.

Component 414 includes a log parser component 418, a multi-level matching component 420, a risk signature tag generator 422, a result output component 424, and can include other items 426 as well.

Briefly, the parsing can be done in any of a number of ways. In one example, log parser component 418 accesses each of a number of entries in the event log and identifies constituent data fields that identify various characteristics or parameters from a respective event or activity in the cloud environment. For example, the parsing can include an identification of what service (e.g., a resource or other asset) had a change, a time that the change occurred, what geographic region the change occurred in, what entity was involved in the change (e.g., a requestor identity), as well as any other attributes. These attributes can be returned as metadata by result output component 424.

Multi-level matching component 420 is configured to perform a multi-level (or input) matching operation to match inputs provided from the matching logic against the event log entries, to identify candidate risk events. In one example, component 424 includes a call function 428 configured to call or invoke an event log entry analyzer that obtains objects from the event log and performs further processing to determine whether the event log has a threshold level match against the risk signature criterion.

Risk signature tag generator 422 is configured to identify the risk signature (or multiple risk signatures) that are matched to the given event log entry, and to generate a risk signature tag that is added to the results metadata. In this way, the orchestration engine or control plane can identify which risk signatures were satisfied in obtaining the candidate risk event. As discussed below, each risk signature can have a globally unique identifier, that uniquely identifies the risk signature from other risk signatures in the set of risk signatures. This global unique identifier can be added (or a representation of the identifier) to the metadata that is retuned by result output component 424.

Figure 5:
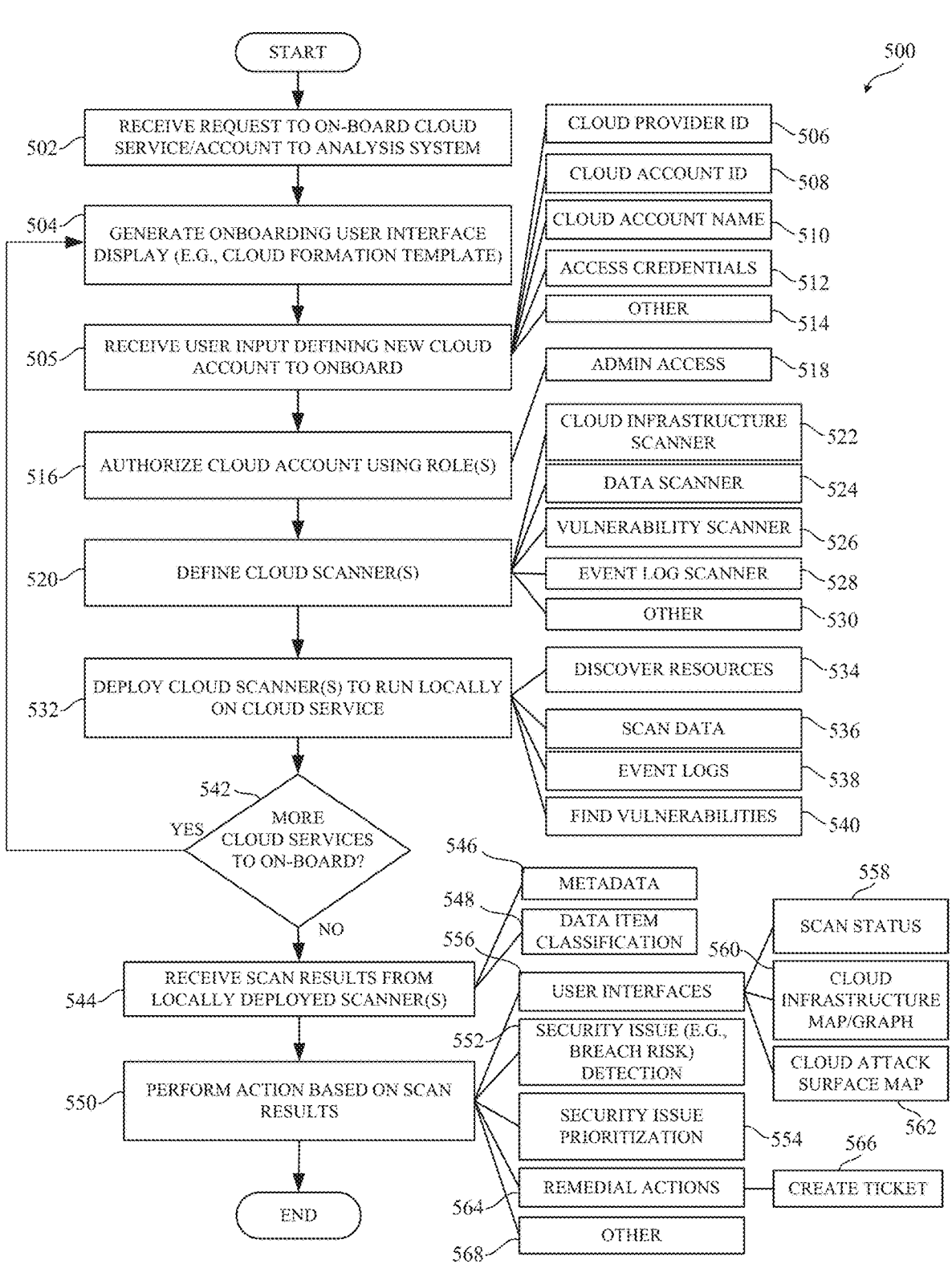
FIG. 5 is a flow diagram showing an example operation of on-boarding a cloud account and deploying one or more scanners.

FIG. 5 is a flow diagram 500 showing an example operation of system 122 in on-boarding a cloud account and deploying one or more scanners. At block 502, a request to on-board a cloud service to cloud security posture analysis system 122 is received. For example, an administrator can submit a request to on-board cloud service 103-1.

At block 504, an on-boarding user interface display is generated. At block 505, user input is received that defines a new cloud account to be on-boarded. The user input can define a cloud provider identification 506, a cloud account identification 508, a cloud account name 510, access credentials to the cloud account 512, and can include other input 514 defining the cloud account to be on-boarded.

At block 516, the cloud account is authorized using roles. For example, administrator access (block 518) can be defined for the cloud scanner using IAM roles. One or more cloud scanners are defined at block 520 and can include, but are not limited to, cloud infrastructure scanners 522, cloud data scanners 524, vulnerability scanners 526, event log scanners 528, or other scanners 530.

At block 532, the cloud scanners are deployed to run locally on the cloud service, such as illustrated in FIG. 2. The cloud scanners discover resources at block 534, scan data in the resources at block 536, event logs at block 538, and can find vulnerabilities at block 540. As discussed in further detail below, a vulnerability can be identified based on finding a predefined risk signature in the cloud service resources. The risk signatures can be queried upon, and define expected behavior within the cloud service and locate anomalies based on this data.

At block 542, if more cloud services are to be on-boarded, operation returns to block 504. At block 544, the scan results from the deployed scanners are received. As noted above, the scan results include metadata (block 546) and/or data item classifications (block 548) generated by the scanners running locally on the cloud service.

At block 550, one or more actions are performed based on the scan results. At block 552, the action includes security issue detection. For example, a breach risk on a particular resource (such as a storage resource storing sensitive data) is identified. At block 554, security issue prioritization can be performed to prioritize the detected security issues. Examples of security issue detection and prioritization are discussed in further detail below. Briefly, security issues can be detected by executing a query against the scan results using vulnerability or risk signatures.

The risk signatures identify criterion such as accessibility of the resources, access and/or permissions between resources, and data types in accessed data stores. Further, each risk signature can be scored and prioritized based on impact. For example, a risk signature can include weights indicative of likelihood of occurrence of a breach and impact if the breach occurs.

A risk signature can be defined based upon any of a wide variety of criteria. For example, a risk signature can identify one or more configurations or settings of compute resources 130. Examples include, but are not limited to, a configuration that indicates whether the compute resource provides accessibility to a particular type of data, such as confidential data, medical data, financial data, personal data, or any other type of private and/or sensitive content. In another example, a risk signature indicates that a compute resource is publicly accessible, includes a public Internet protocol (IP) address, or has IP forwarding enabled. In another example, a risk signature indicates that a compute resource has monitoring disabled, has no IAM role assigned to the compute resource, has backup disabled, data encryption disabled, and/or a low or short backup retention policy. Also, a risk signature can identify password policies set for the compute resource. For instance, a risk signature can indicate a lack of minimum password policies, such as no minimum password length, no requirement of symbols, lowercase letters, uppercase letters, numbers, or password reuse policy. Also, a risk criterion can indicate a location of the compute resource, such as whether the compute resource is located outside of a particular region.

Risk signatures can also indicate configurations and/or settings of storage resources 132. For example, the configurations and settings can indicate authentication or permissions enforced by the storage resource, such as whether authentication is required for read, write, delete, synchronization, or any other operation. Also, the risk signature can indicate whether multi-factor authentication is disabled for the storage resource, as well as a breadth of permissions grants (e.g., whether all authenticated users are granted permissions within the storage resource). Also, a risk signature can indicate whether encryption is enabled by default, a password policy enforced by the storage resource, whether the storage resource is anonymously accessible, publicly accessible, has a key management service disabled, has logging disabled, life cycle management disabled, whether the storage resource is utilized for website hosting, has geo-restriction disabled, or has backup functionality disabled. Also, the risk signature can indicate a type of data stored by the storage resource, such as the examples discussed above.

The action can further include providing user interfaces at block 556 that indicate the scan status (block 558), a cloud infrastructure representation (such as a map or graph) (block 560), and/or a cloud attack surface representation (map or graph) (block 562). The cloud attack surface representation can visualize vulnerabilities.

Remedial actions can be taken at block 564, such as creating a ticket (block 566) for a developer or other user to address the security issues. Of course, other actions can be taken at block 568. For instance, the system can make adjustments to cloud account settings/configurations to address/remedy the security issues.

Figure 6:
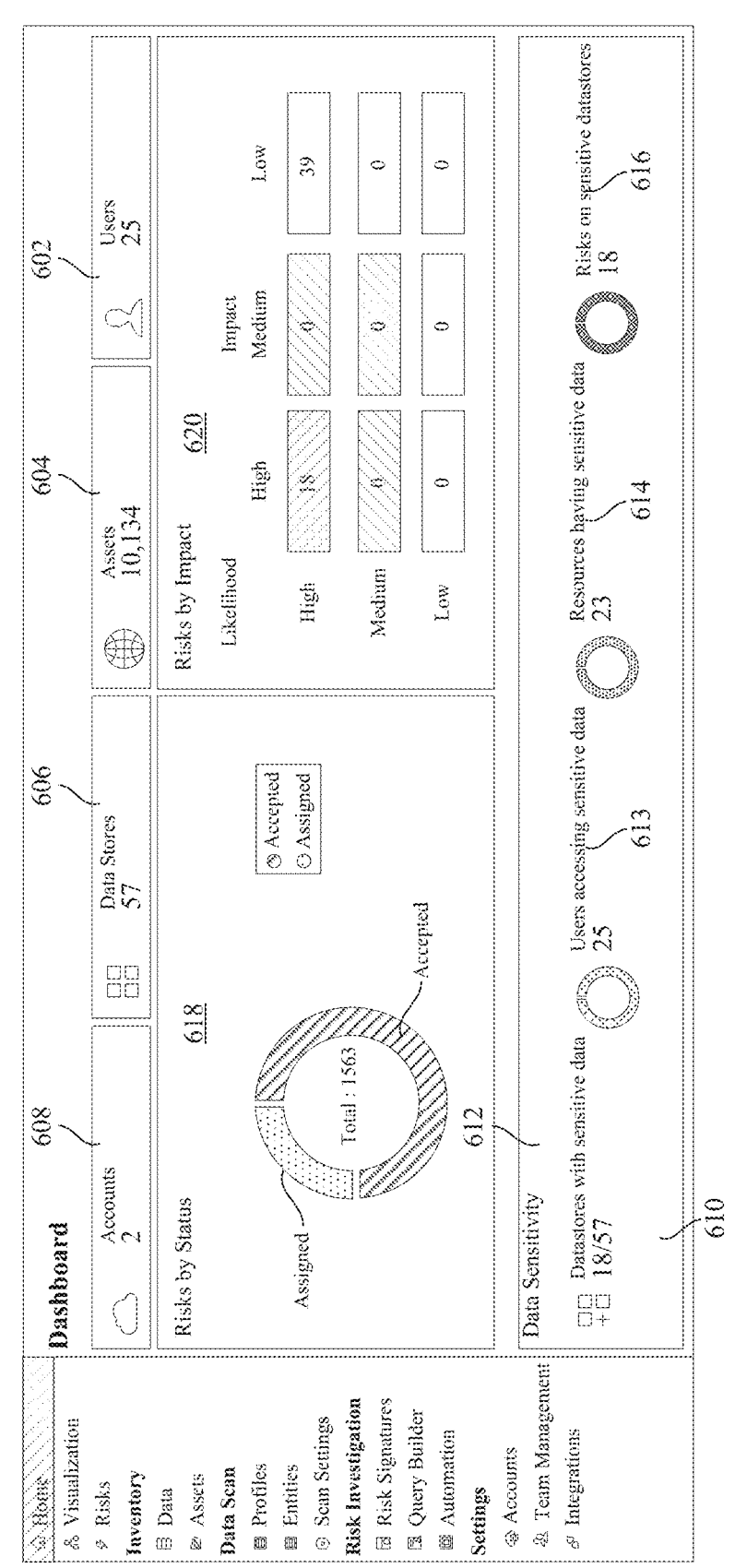
FIG. 6 illustrates one example of a user interface display having a dashboard representing on-boarded cloud service accounts.

FIG. 6 illustrates one example of a user interface display 600, that can be displayed at block 552. Display 600 provides a dashboard for a user which provides an overview of on-boarded cloud service accounts. The dashboard identifies a number of users 602, a number of assets 604, a number of data stores 606, and a number of accounts 608. A data sensitivity pane 610 includes a display element 612 that identifies a number of the data stores that include sensitive data, a display element 613 that identifies a number of users with access to the sensitive data, a display element 614 that identifies a number of resources having sensitive data, and a display element 616 that identifies a number of risks on the data stores having sensitive data. Further, graphs or charts can be generated to identify those risks based on factors such as status (display element 618) or impact (display element 620).

Display element 620 illustratively categorizes the risks based on impact as well as the likelihood of occurrence of those risks. Risk categorization is discussed in further detail below. Briefly, however, display element 620 stratifies one or more breach likelihood scores or breach impact scores categories representing different levels of severity, such as high, medium, and low severity levels. In one example, display element 620 is color coded based on the degree of impact of the risk (e.g., high impact is highlighted in red, medium impact is highlighted in yellow, and low impact is highlighted in green).

Figure 7:
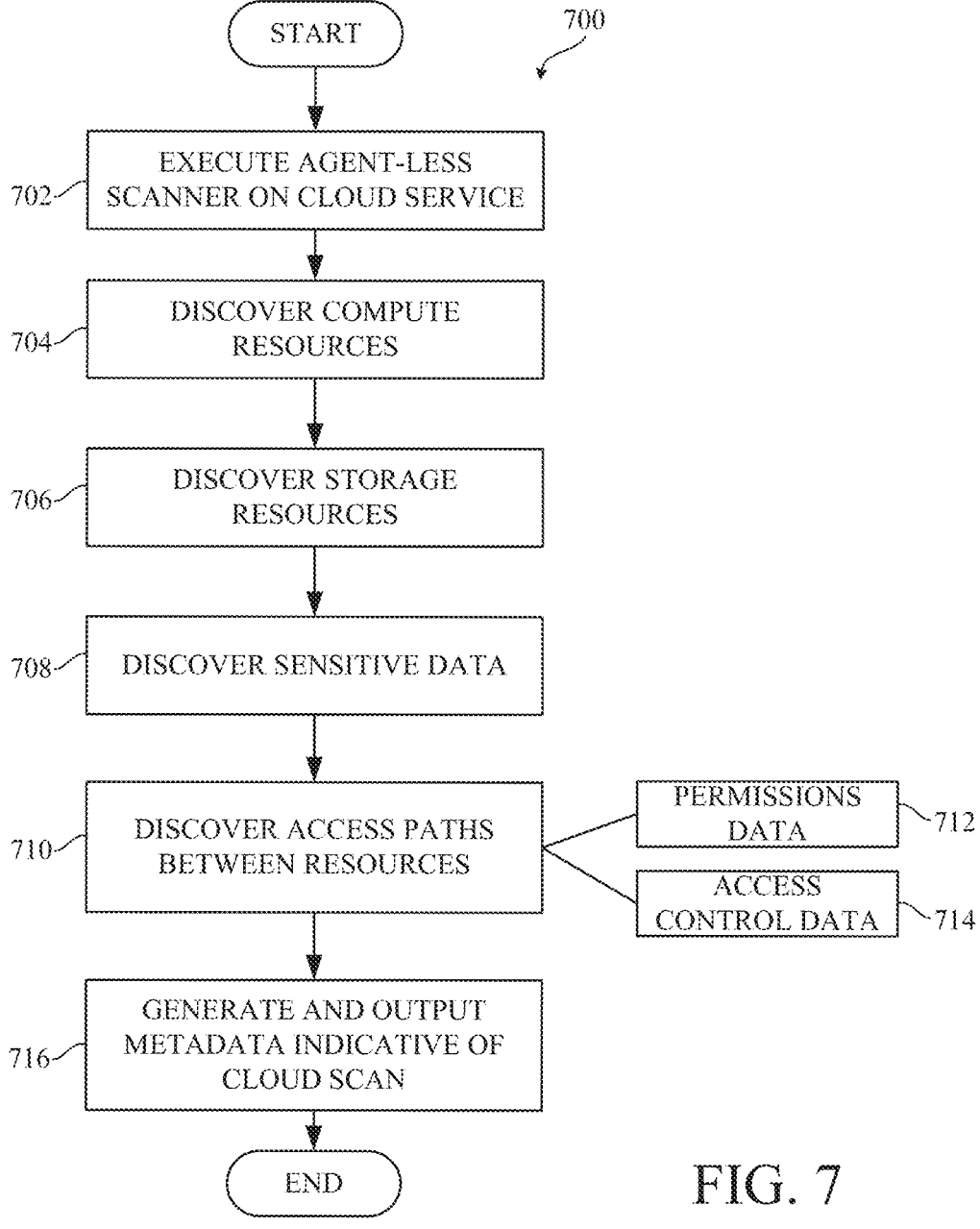
FIG. 7 is a flow diagram illustrating one example of cloud infrastructure scanning performed by a cloud scanner deployed in a cloud service.

FIG. 7 is a flow diagram 700 illustrating one example of cloud infrastructure scanning performed by cloud scanner 148 deployed in cloud service 103-1. At block 702, an agent-less scanner is executed on the cloud service. For example, a compute resource can utilize a serverless function to perform a scan on the cloud service.

At block 704, the scanner discovers the compute resources 130 and, at block 706, the storage resources 132. Sensitive data can be discovered at block 708. The agent-less scanner does not require a proxy or agent running in the cloud service, and can utilize server-less containers and resources to scan the documents and detect sensitive data. The data can be accessed using APIs associated with the scanners. The sensitive data can be identified using pattern matching, such as by querying the data using predefined risk signatures.

At block 710, access paths between the resources are discovered based on permissions data 136 (block 712), and/or access control data 138 (block 714). A rule processing engine, such as using JSON metadata, can be utilized to analyze the roles and policies, and can build access relationships between the nodes representing the resources. The policies can be decoded to get access type (allow, deny, etc.) and the policy can be placed in a node to link from a source to target node and create the access relationship. At block 716, metadata indicative of the scanning results is generated and outputted by output component 412.

Figure 8A:
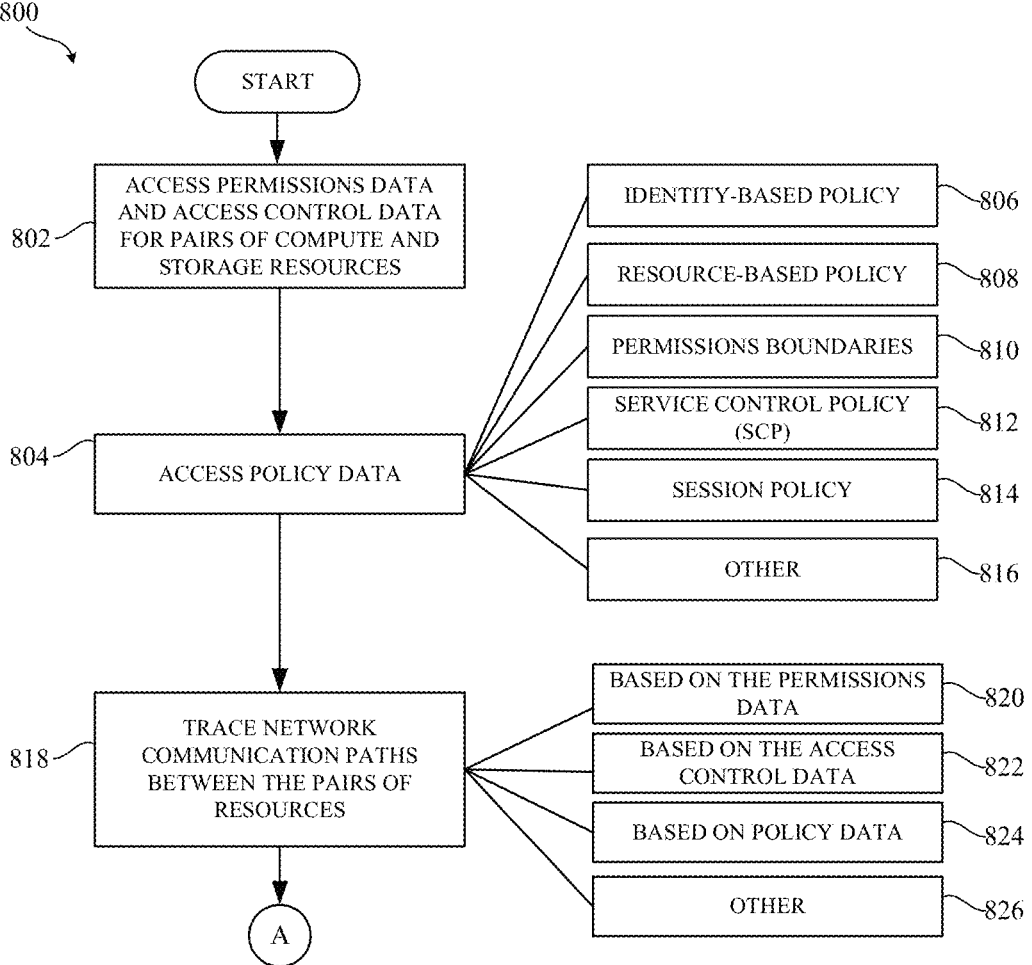
FIGS. 8A and 8B (collectively referred to as FIG. 8) provide a flow diagram illustrating one example of infrastructure analysis and query execution.
Figure 8B:
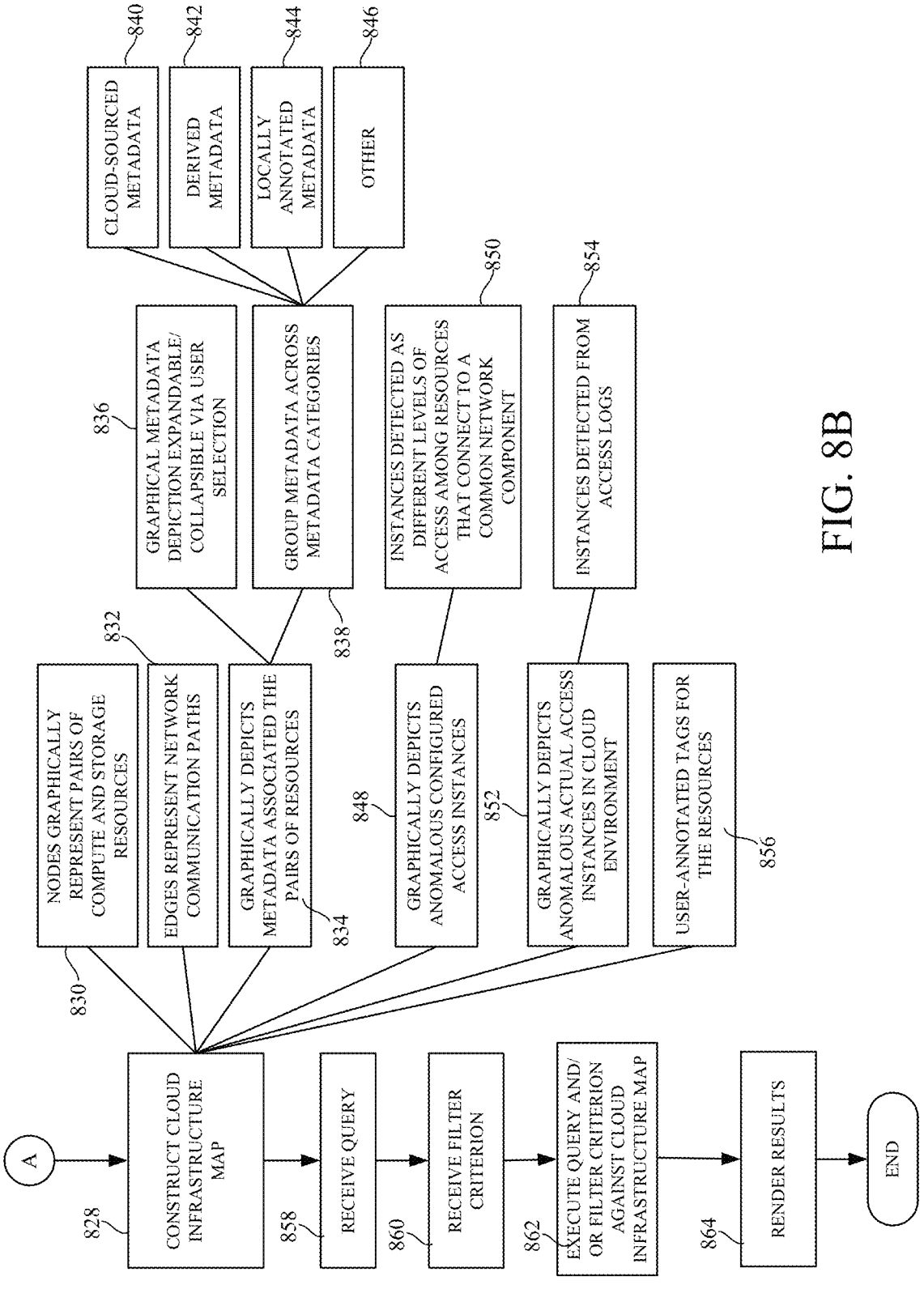

FIGS. 8-1 and 8-2 (collectively referred to as FIG. 8) provide a flow diagram 800 illustrating one example of infrastructure analysis and query execution. At block 802, permissions data and access control data for pairs of compute and storage resources is accessed. Policy data is accessed at block 804. For example, the policy data can include identity-based policies (block 806), resource-based policies (block 808), permissions boundaries (block 810), service control policies (SCP) (block 812), session policies (block 814) as well as other policies (block 816).

At block 818, network communication paths are traced between the pairs of resources. Tracing the network communication path can be based on the permissions data at block 820, the access control data at block 822, the policy data at block 824, and/or other data at block 826.

At block 828, a cloud infrastructure map is constructed. An example of a cloud infrastructure map includes nodes that graphically represent pairs of compute and storage resources (block 830), and edges that represent network communication paths between the resources (block 832). At block 834, the map graphically depicts metadata associated with the pairs of resources. For example, a graphical metadata depiction is expandable or collapsible via user selection, as represented at block 836. The metadata can be grouped across metadata categories at block 838, such as based on cloud-sourced metadata at block 840, derived metadata at block 842, locally annotated metadata at block 844, or based on other metadata categories at block 846.

The cloud infrastructure map can also graphically depict anomalous configured access instances at block 848. For example, block 848 can detect different levels of access among resources that connect to a common network component, as represented at block 850. At block 852, the map graphically depicts anomalous actual access instances in the cloud environment. For instance, the instances can be detected from access logs at block 854. User annotated tags for the resources can be depicted in the map at block 856 as well.

At block 858, a query is received. The query can include a search term, a content category, a data privacy policy, a temporal period, and can include other items as well.

Alternatively, or in addition, a filter criterion is received can be received at block 860. The filter criterion can be based on the metadata, based on applications running on at least one pair of resources, and/or based on one or more networks in the cloud environment.

The query and/or filter criterion are executed at block 862 and results are returned at block 864. For example, the query results can identify a subset of the pairs of resources that contain searched content.

Figure 9:
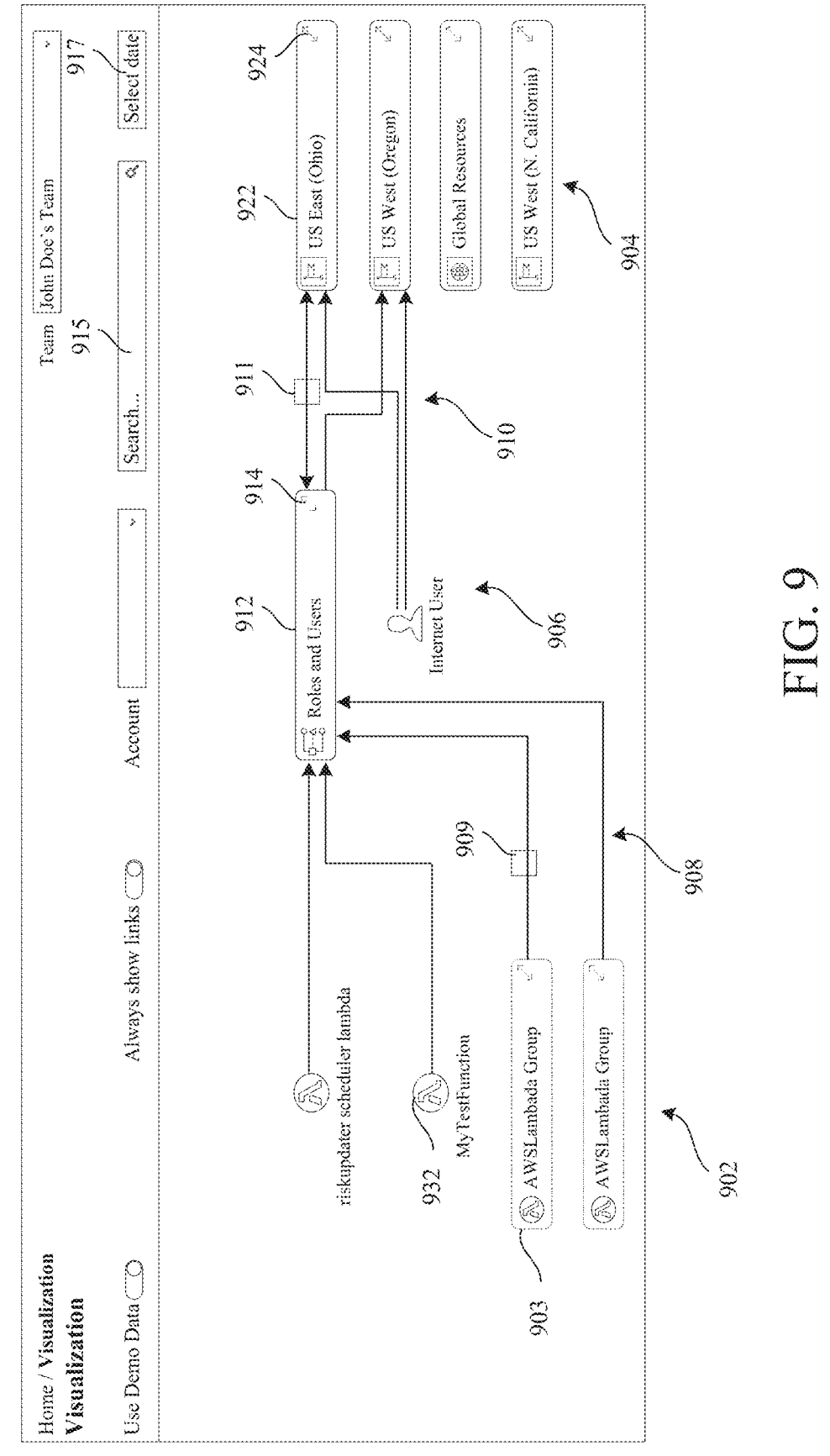
FIG. 9 illustrates an example user interface display.

FIG. 9 illustrates a user interface display 900 that includes a visualization of cloud infrastructure assets and relationships between those assets, such as access communication paths. The visualization in FIG. 9 can be rendered as a cloud infrastructure graph (e.g., map) that shows relationships between compute and storage resources and/or mappings between users, roles, and resources, based on the permissions data and the access control data. Further, the visualization can be augmented using sensitivity classification data to represent propagation of breach attack along communication paths.

As shown in FIG. 9, nodes 902 represent compute resources and nodes 904 represent storage resources. Illustratively, the storage resources include data stores or buckets within a particular cloud service. Nodes 906 represent roles and/or users. The links (e.g., access paths) or edges 908 between nodes 902 and 906 represent compute resources that can access the particular roles represented by nodes 906. The edges or links 910 represent the storage resources that can be accessed by the particular roles or users represented by nodes 906.

Based on these relationships between compute and storage relationships, display elements can be rendered along, or otherwise visually associated with, the edges 908 and/or 910, to identify and graphically depict the propagation of breach attack. For instance, vulnerability display elements can be rendered in association with edges 908 and/or 910 to identify that a subject vulnerability signature (e.g., one or more risk signatures shown in FIG. 9) has been identified in the data, based on querying the permissions and access control data using the subject vulnerability signature. For example, display element 909 represents a risk signature between nodes 903 and 912 and display element 911 represents (such as by including a description, icon, label, etc.) a risk signature between nodes 912 and 922. Each display element 909, 911 can represent (such as by including a description, icon, label, etc.) corresponding likelihood and impact scores, can be actuatable to render details of the subject vulnerability, such as in a display pane on display 900. The details can include which risk signature has been matched, which sensitive data is at risk, etc.

Figure 10:
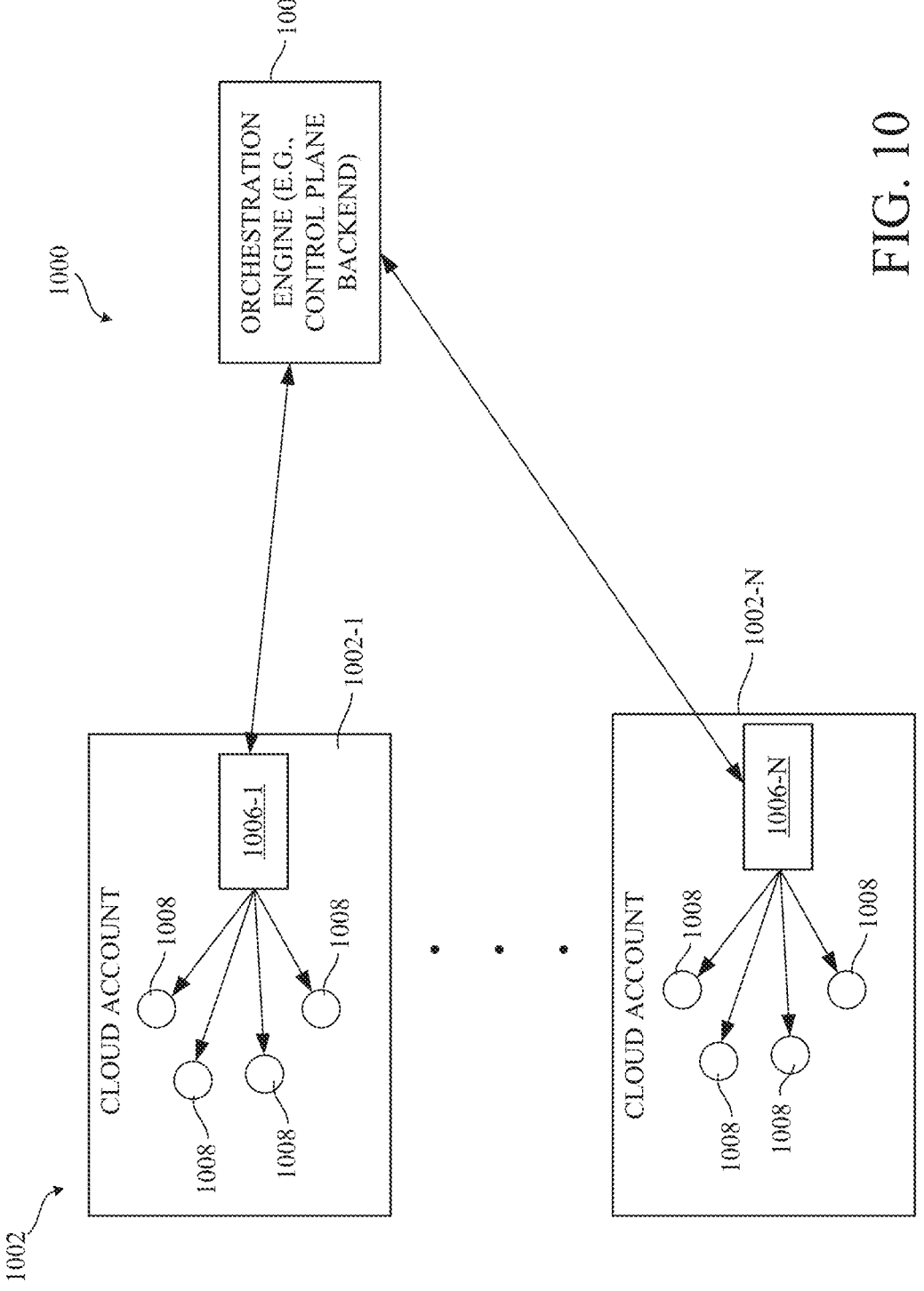
FIG. 10 is a schematic diagram of a cloud environment.
Figure 11A:
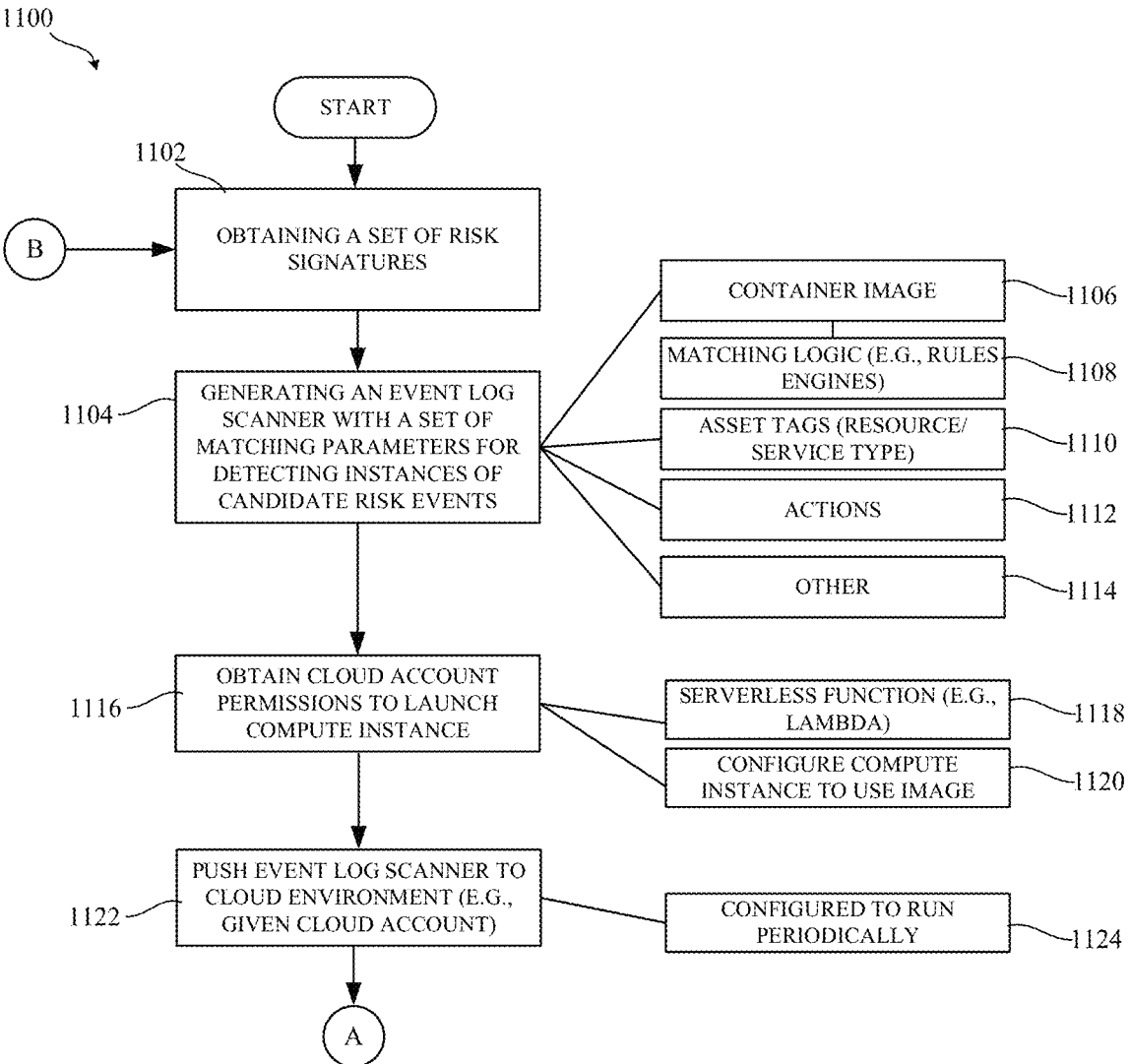
FIGS. 11A and 11B (collectively referred to as FIG. 11) provides a flow diagram illustrating one example of operation of an orchestration engine.
Figure 11B:
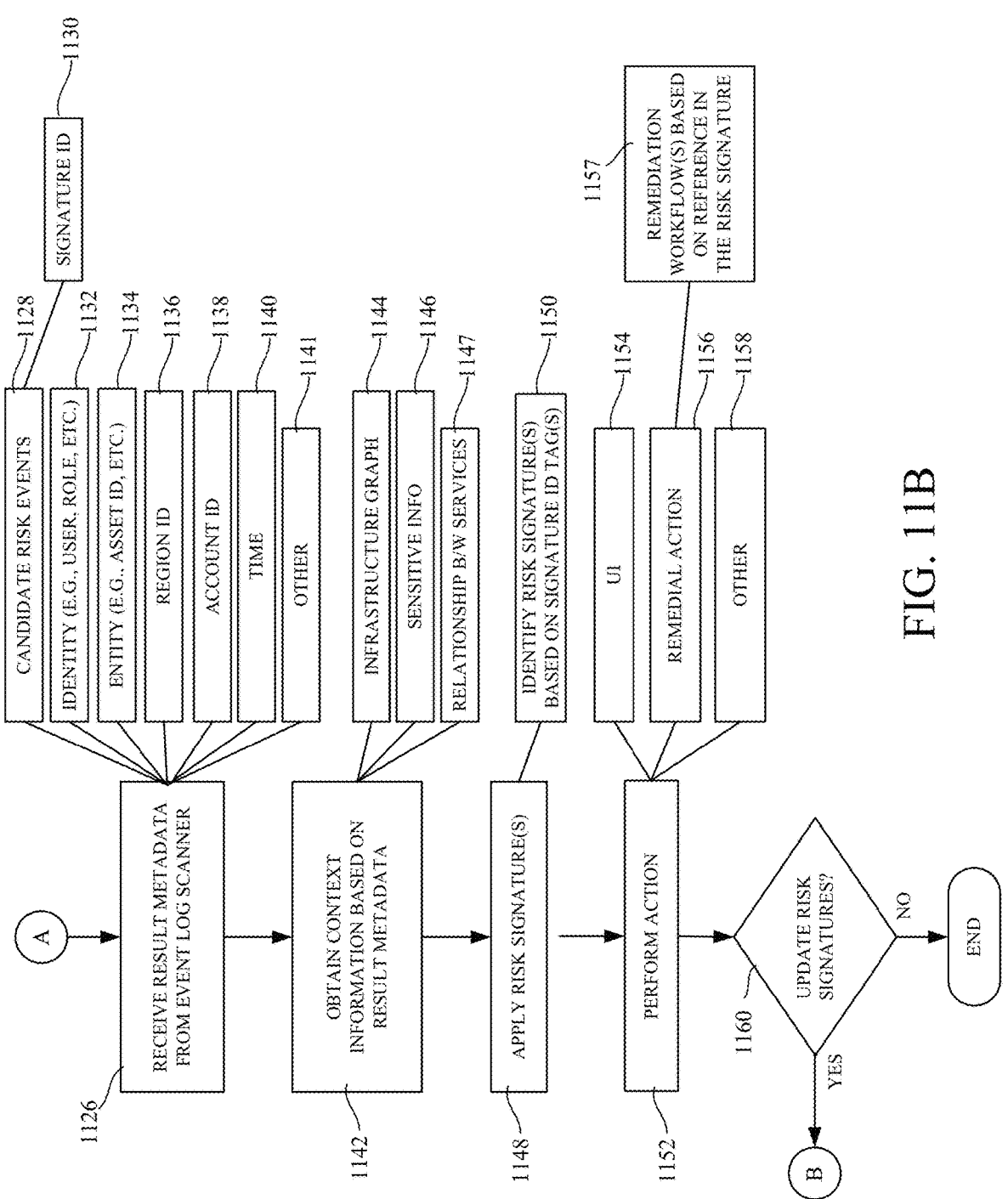

FIG. 10 is a schematic diagram of a cloud environment 1000 including a plurality of cloud accounts 1002-1, 1002-N (collectively referred to as cloud accounts 1002). An orchestration engine 1004 is configured by orchestration engine configuration component 354. FIG. 10 will be discussed in the context of FIG. 11, which provides a flow diagram 1100 illustrating one example of operation of orchestration engine 1004.

At block 1102, a set of risk signatures is obtained. At block 1104, an event log scanner is generated with a set of matching parameters for detecting instances of candidate risk events, based on the set of risk signatures obtained at block 1102. For example, an event log scanner includes code deployable through a container image, as represented at block 1106. In one example, the event log scanner includes matching logic, such a rules engine (represented at block 1108) configured to match the set of matching parameters against event logs.

The matching parameters can include, but are not limited to, asset tags (block 1110), actions 1112, or other matching parameters 1114. For example, if a risk signature is an RDS service with a sharing operation, then the matching parameters can include an RDS service asset tag and a sharing operation action.

At block 1116, cloud account permissions are obtained to launch a compute instance on the cloud account. For example, the compute instance can include a serverless function (block 1118) (such as an AWS lambda). In one example, the compute instance is configured to use the container image provided by the orchestration engine, as represented at block 1120. At block 1122, the event scanner is pushed to the cloud environment using the permissions obtained at block 1106. For example, the event log scanner can be deployed to each cloud account, and configured to run periodically in accordance with a predefined schedule, as represented at block 1124.

As shown in FIG. 10, event log scanners 1006-1 and 1006-N are deployed on respective cloud accounts and configured to access one or more event logs 1008.

Referring again to FIG. 11, at block 1126, result metadata is received from the event log scanners at the orchestration engine 1004. The result metadata represents candidate risk events, as represented at block 1128. A candidate risk event illustratively includes an instance of an event from an event log that has a threshold match against a particular risk signature. Each candidate risk event can include an associated signature ID (block 1130) that indicates which risk signature(s) the candidate risk event was matched to.

The result metadata can also include identity metadata (block 1132), entity metadata (block 1134), a region identifier (block 1136), an account identifier (block 1138), a time identifier (block 1140), or other metadata (block 1142).

Identity metadata can indicate a particular identity, such as a user, role, etc. corresponding to the event identified as the candidate risk event. The identity metadata can include, for example, an asset ID that identifies the particular cloud asset (a compute resource, a storage resource, etc.) that was the target of or otherwise associated with the candidate risk event.

A region identifier can identify a particular geographic region in which the event occurred, a cloud identifier can indicate the particular cloud account within which the event was identified, and the time metadata can include a timestamp that indicates the time at which the event occurred.

One or more post-processing steps can be performed based on the result metadata. In one example, context information is obtained based on the result metadata at block 1142. For example, the context information can be obtained from an infrastructure graph. Examples of infrastructure graphs are discussed above. For instance, based on the infrastructure graph, block 1142 can determine whether sensitive information was involved in the candidate risk event, as represented at block 1144. Alternatively, or in addition, the context information can identify relationships between the services.

For sake of illustration, assume a given candidate risk even included an event that matched the risk signature (RDS service with sharing operation). The context information obtained at block 1142 can indicate whether the RDS service involved in the event included or otherwise had access to sensitive information (based on the infrastructure graph), and whether the sharing operation was with a service that was publicly accessible. In another example, the context information can identify resource configuration issues (e.g., user hasn't updated password in thirty days, user has more than one active access key, etc.).

At block 1148, for each candidate risk event, the corresponding risk signature is applied to determine whether the candidate risk event is to be classified as an actual risk event. In one example, this includes identifying the risk signature based on the signature ID 1130, as represented at block 1150.

At block 1152, other actions can be performed based on the identified risk events. For example, a user interface display can be generated at block 1154 to render the risk events detected by application of the risk signatures. Alternatively, or in addition, one or more remedial actions can be performed at block 1156.

In one example, at block 1157, one or more remediation workflows are executed based on a reference in the risk signature(s) identified at block 1150. In one example, each risk signature includes a pointer (or other reference) to one or more remediation workflows stored in data store 310. During execution, system 330 identifies a particular risk signature, that is identified based on matching to an event in the event log, and accesses a pointer to obtain a corresponding remediation workflow from remediation library 349. Remediation action control signal component 359 generates control signals to execute the commands defined in the remediation workflow, based on the defined inputs and any conditional inputs identified based on the detected event, within the cloud service. The results of the remedial workflow execution can be provided in a user interface display, such as identifying which commands executed successfully, which commands failed, which commands require further input or intervention, etc.

Of course, other actions can be performed as well, as represented at block 1158.

At block 1160, operation determines whether the risk signatures have been updated. If so, operation can return to generate an updated event log scanner, for example through creation of a new container image, to be pushed to the cloud accounts to scan for further candidate risk events.

Figure 12:
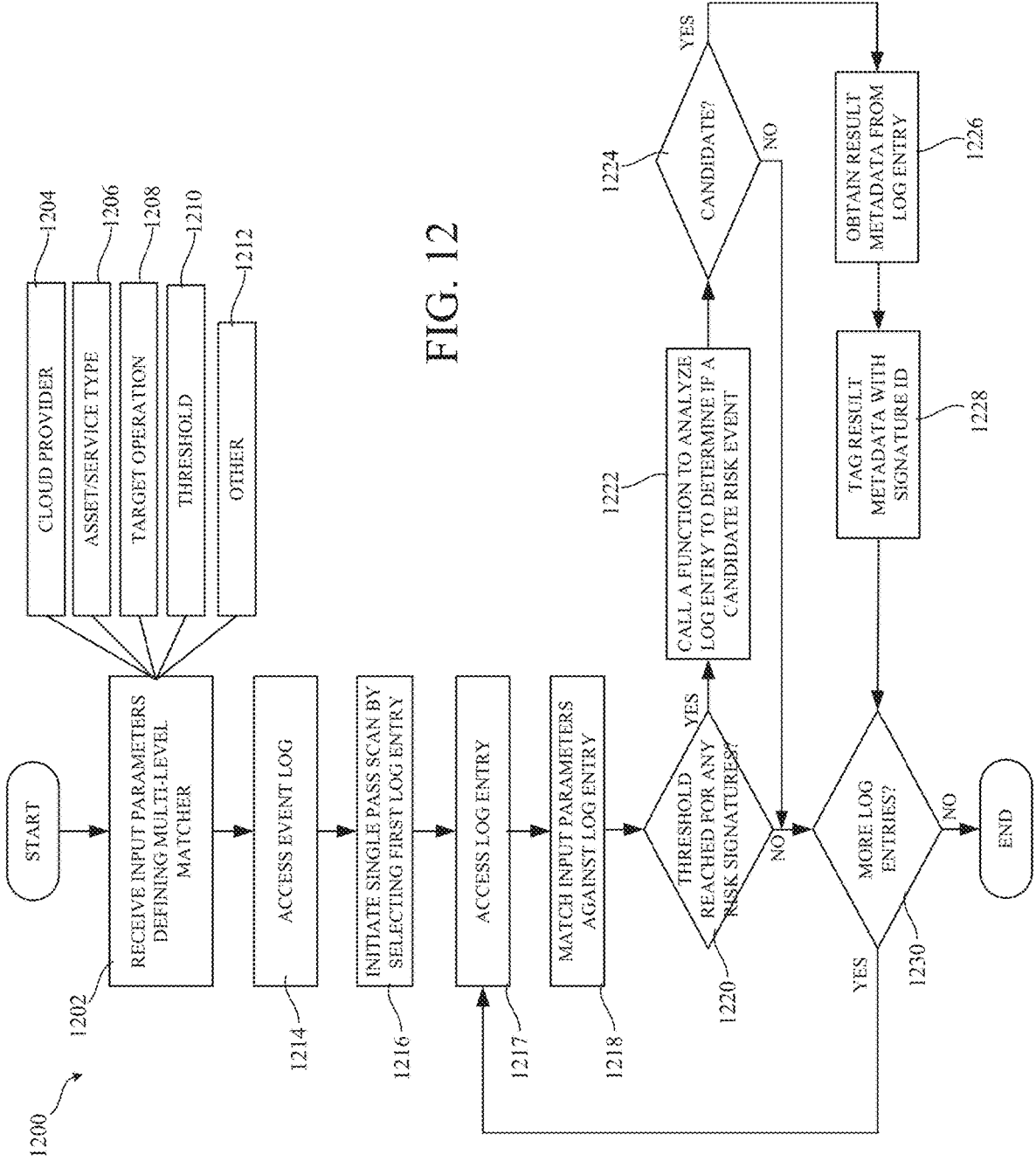
FIG. 12 is a flow diagram illustrating one example of operation of an event log scanner.

FIG. 12 is a flow diagram 1200 illustrating one example of operation of an event log scanner. At block 1202, input parameters are received that define a multi-level matcher to be executed by a rules engine. For example, the input parameters can include, but are not limited to, a cloud provider, an asset/service type 1206, a target operation 1208, a threshold match level (1210), and can include other parameters 1212 as well.

At block 1214, an event log is accessed by the scanner to apply the multi-level matcher configured based on the input parameters. In one example, the scanner performs a single pass scan of the event log at block 1216. Illustratively, the single pass scan includes analysis of each entry in the event log only once, so that multiple passes of the event log are not required even if multiple different risk signatures are being utilized as a basis for candidate risk event detection.

For the particular log entry being considered (accessed at block 1218), the input parameters are matched against the log entry at block 1218 and block 1220 determines whether there is a threshold match level reached. For example, assume the input parameters include AWS as the cloud provider, the asset type as an RDS service, and the target operation as a sharing operation. Block 1220 can determine whether the log entry indicates that the event at least included an RDS service within an AWS account that included an operation that shared data, for example to another service/asset. If the threshold is reached, operation proceeds to block 1222 in which a function is called to further analyze the log entry to determine if a candidate risk event exists. A function can be configured for each different risk signature. In this way, a risk signature-specific function is called if a match threshold is reached for that given risk signature.

If a candidate risk event is determined at block 1224, operation proceeds to block 1226 in which result metadata is obtained from the log entry. Examples of the result metadata that can be obtained is illustrated above with respect to block 1126. At block 1228, the result metadata is tagged with the signature identifier that uniquely identifies the particular risk signature for which the candidate risk event is detected.

At block 1230, it is determined whether more log entries exist in the event log. If so, operation returns to block 1228 in which the input parameters are matched against the log entry.

Figure 13:
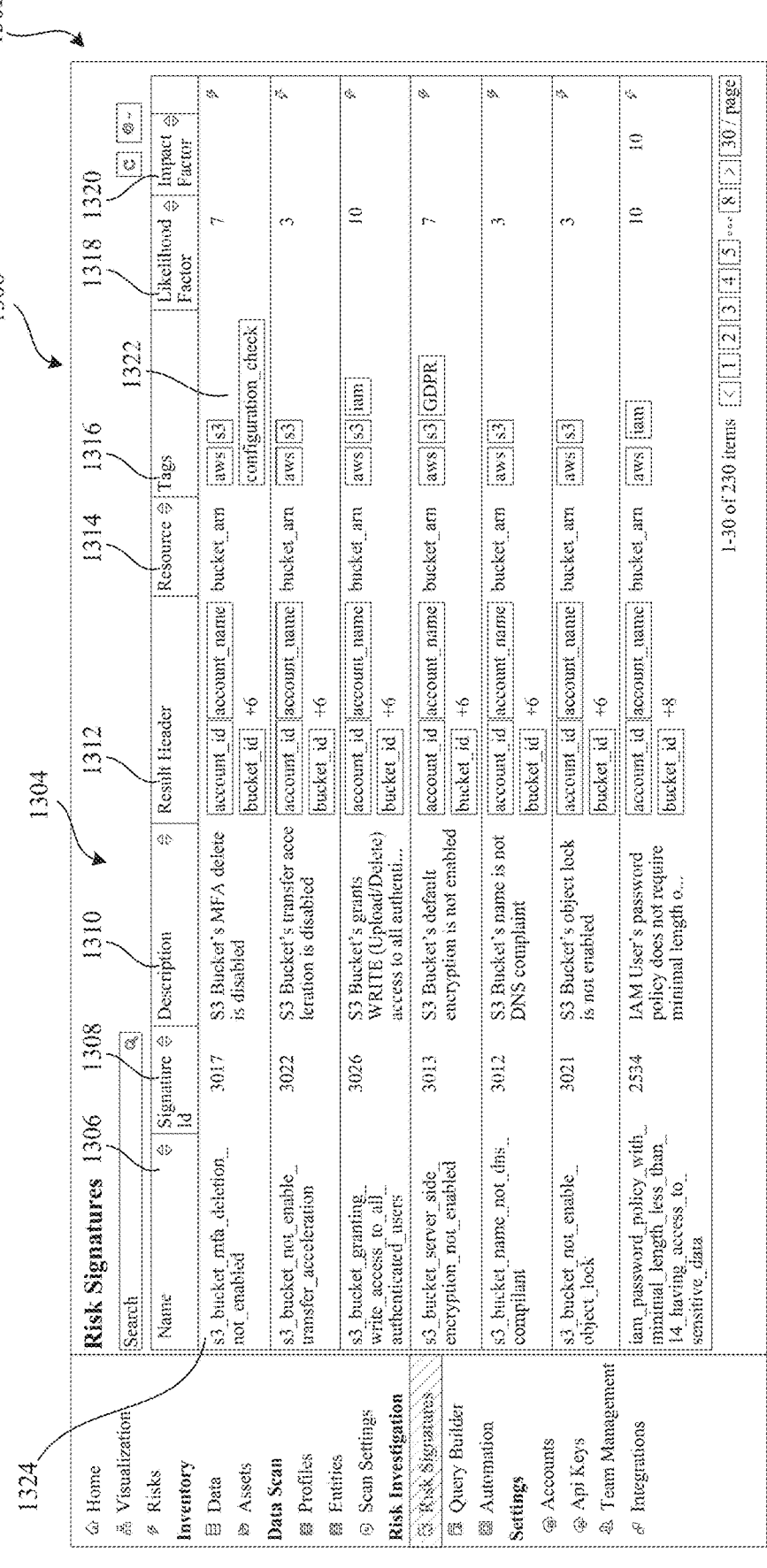
FIG. 13 illustrates one example of a user interface display that renders a set of tagged risk signatures.

FIG. 13 illustrates one example of a user interface display 1300, that renders a set of tagged risk signatures. As shown in FIG. 13, display 1300 provides a searchable interface to access, modify, add, and/or delete risk signatures that can be applied to the cloud infrastructure posture. Each risk signature defines a set of criteria that the resources and data in the cloud environment can be queries upon to identify indications of vulnerabilities in the cloud service.

The example of FIG. 13 provides the set of tagged risk signatures in a tabular format, having a plurality of rows 1302 each representing a different risk signature. Each row includes a plurality of data fields or cells arranged in a plurality of columns 1304. The plurality of columns includes a name column 1306, a signature ID column 1308, a description column 1310, a result header column 1312, a resource column 1314, a tags column 1316, a breach likelihood factor column 1318, and a breach impact factor column 1320. Column 1306 includes a name of the given risk signature, uniquely identified by a signature ID in column 1308. The description column 1310 describes the risk signature, and the result header column 1312 identifies the information to be returned in results that match the risk signature. The tags column 1316 identifies one or more tags, for the given risk signature. The tags identify characteristics of the resources to which the risk signature applies. For example, the tags 1322 for risk signature 1324 indicate that the risk signature is applicable to S3 resources. This, of course, is for sake of example only.

Likelihood factor column 1318 indicates a likelihood factor that is assigned to the risk signature and an impact factor column 1320 indicates an impact factor assigned to the risk signature. The likelihood factor indicates a likelihood assigned to occurrence of the risk signature and the impact factor assigns an impact to the cloud service assigned to the occurrence of the risk signature. For sake of illustration, a likelihood factor of ten (out of a scale of ten) indicates that the vulnerability is likely to occur if the risk signature is identified in the cloud posture data, whereas a likelihood factor of one indicates a low likelihood. Similarly, an impact factor of ten (out of a scale of ten) indicates that the vulnerability is considered to have a high impact, whereas an impact factor of one indicates the vulnerability is considered to have a low impact on the cloud service.

As noted above, results of the instances of matching risk signatures are outputted, for example in a user interface display. One example display is illustrated in FIG. 14.

Figure 14:
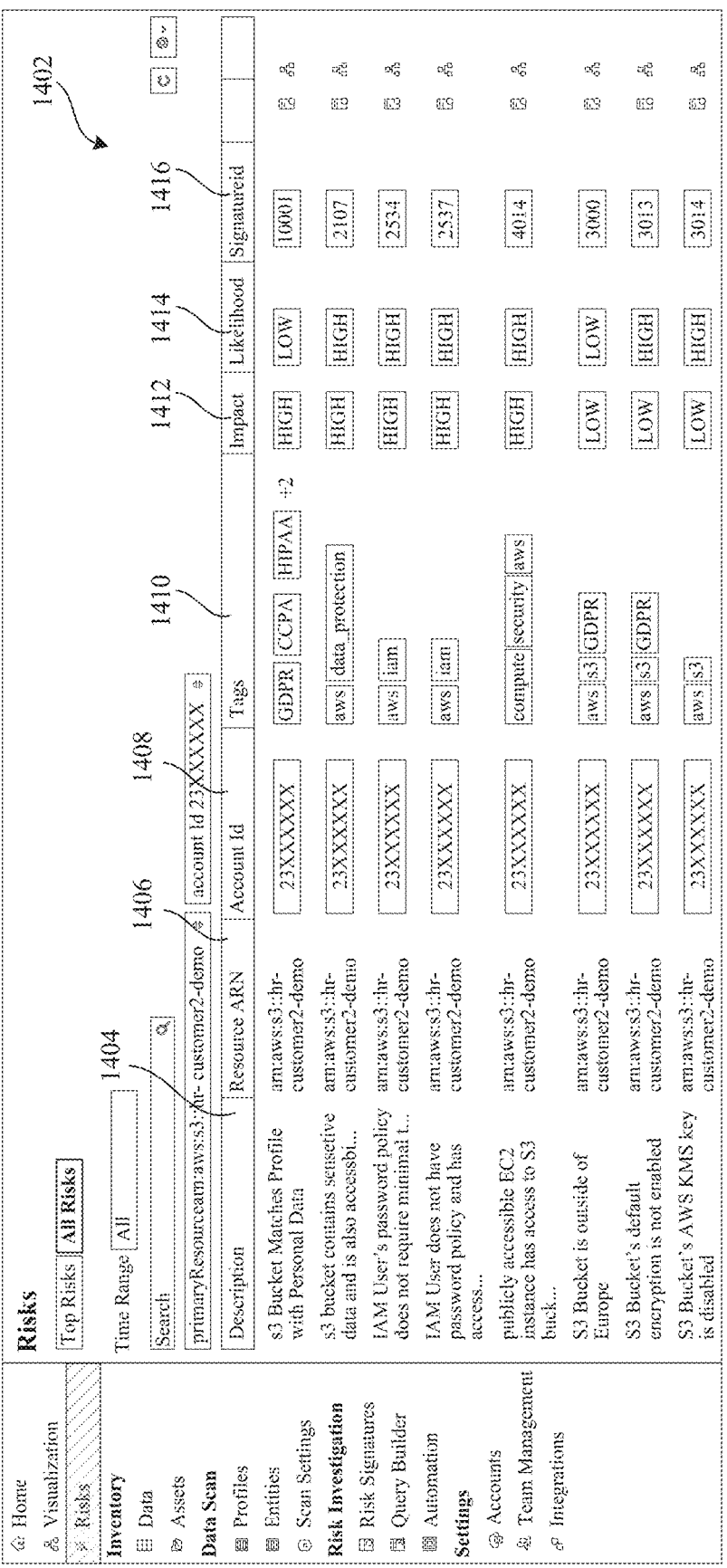
FIG. 14 illustrates one example of a user interface display that renders instances of matched risk signatures.

As shown in FIG. 14, display 1400 includes a plurality of rows 1402 that indicate matching instances of risk signatures. Each row includes a description field in column 1404, a resource name field in column 1406, an account ID field in column 1408, a tags field in column 1410, an impact field in column 1412, a likelihood field in column 1414, and a signature ID field in column 1416. The signature ID field in column 1416 identifies the signature ID that was matched by the instance identified in the row. The tags field identifies which tags were matched between the infrastructure change and the risk signature that was matched for the given row.

Figure 15:
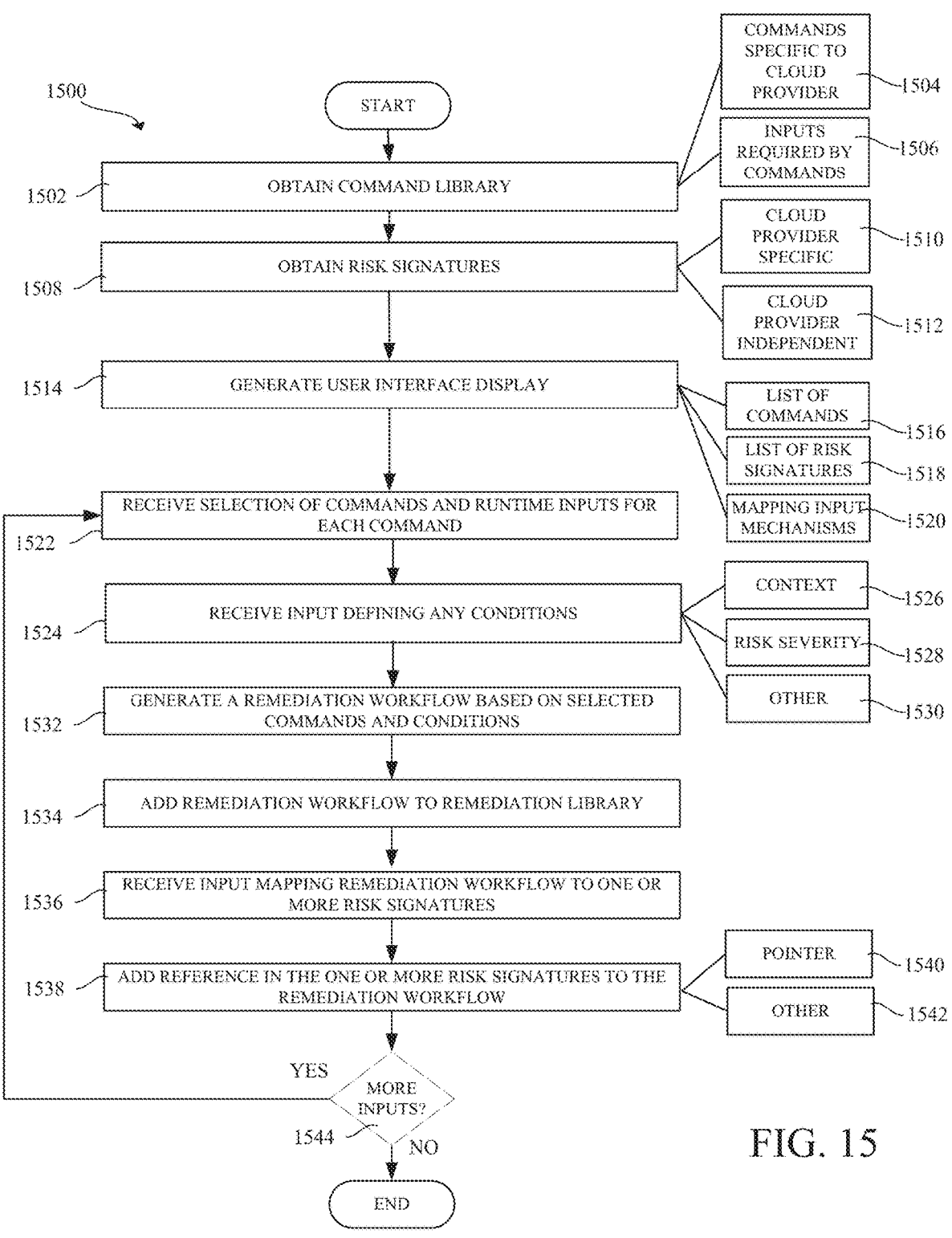
FIG. 15 is a flow diagram illustrating one example of generating a remediation workflow and mapping the remediation workflow to risk signature(s).

FIG. 15 is a flow diagram 1500 illustrating one example of generating a remediation workflow and mapping the remediation workflow to risk signature(s).

At block 1502, a command library (e.g., command library 164) is obtained from the particular cloud service for which the remediation workflow is being generated. The command library can include commands specific to the particular cloud provider (represented at block 1502) and the inputs required by the commands in the command library (represented by block 1506).

At block 1508, a set of risk signatures is obtained, e.g., risk signatures 347 in data store 310. The risk signatures can be cloud provider-specific (block 1510) and/or cloud provider independent (block 1512). That is, a cloud provider-specific risk signature is a risk signature that is defined specifically to resources or other assets of a particular cloud provider. For example, a risk signature that defines a set of actions and conditions on an AWS S3 bucket can be considered cloud provider-specific, whereas a risk signature that can be applicable to S3 buckets, Azure blobs, a Google cloud storage bucket, etc.

At block 1514, a user interface display is generated and can include, for example, a list of commands from the command library (block 1516), a list of the risk signatures (block 1518), and user input mechanisms, such as mapping input mechanisms 1520. Of course, the user interface display can include other elements and controls as well.

At block 1522, a selection of a set of commands from the command library and the runtime inputs for those selected commands is received. For example, the selection at block 1522 can include a drag and drop input that arranges the set of commands in an execution order. Of course, other inputs can be provided as well.

At block 1524, input is received defining any conditions for execution of the remediation workflow at runtime. Example of conditions include contextual information (block 1526), risk severity (block 1528) and other conditions (block 1530). For example, context information can include data types that are identified (whether sensitive data is involved, etc.) and a level of the risk, such as a breach likelihood or breach impact.

At block 1532, a remediation workflow is generated based on the selected commands and conditions. At block 1534, the remediation workflow is added to a remediation library (e.g., remediation library 349). At block 1536, an input is received that maps the remediation workflow to one or more risk signatures. For example, a user can select one or more risk signatures from the list of risk signatures (block 1518) that are to invoke the remediation library when an instance of the risk signature is detected.

At block 1538, a reference is added in the risk signature(s) to the remediation workflow. For example, this can include a pointer added in the risk signature itself. Of course, the risk signature can be added in other ways as well. For example, this can include adding a lookup table or index that is searched based on a risk signature ID (represented at block 1542).

At block 1544, the operation determines whether there are more inputs received to define any additional remediation workflows.

FIG. 16 is a flow diagram 1600 illustrating an example operation of initiation and execution of a remediation workflow.

At block 1602, an event is detected. For example, an event can be detected by an event log scanner that scans and event log in a cloud account. At block 1604, one or more risk signatures are obtained, for example from risk signatures 347. Examples risk signatures are discussed above.

At block 1606, the operation determines one or more of the risk signatures that correspond to the detected event. For instance, block 1606 can include determining a threshold match between a given risk signatures and the event at block 1608. The threshold match can be determined in any of a number of ways. For instance, a threshold match can be determined if a predefined number of elements of the risk signature (e.g., assets and relationships) are found to exist in the detected event. This, of course, is for sake of example only.

At block 1610, any contextual information is identified. For example, an infrastructure graph can be accessed to identify whether the detected event includes sensitive data, has a relationship to a vulnerable resource, etc. For sake of illustration, an event log scanner can identifier that S3 bucket was accessed by a publicly accessible compute resource. Here, an infrastructure graph can be accessed to determine whether the S3 bucket included sensitive data.

At block 1614, a risk severity metric is generated based on the context information. At block 1616, a reference to a remediation workflow is obtained based on the risk signature identified at block 1604. For example, block 1616 can include obtaining a pointer in the risk signature itself, as represented at block 1618. In another example, a separate mapping, such as an in a lookup table, can be utilized (represented at block 1620).

At block 1622, the remediation workflow is retrieved using the reference and, at block 1624, the remediation workflow is initiated based on the context information. For example, remediation action control signal component 359 controls the cloud service to execute the commands defined in the remediation workflow. At block 1626, the operation detects whether any commands in the remediation workflow have failed. Indications of command failure can be rendered at block 1628. At block 1630, operation determines whether there are any additional events detected.

It can thus be seen that the present disclosure provides technology for data security posture analysis of a cloud environment that identifies risk events and automates execution of remediation workflows as soon as the risk is detected. Further, the present system provides tools for configuring remediation workflows that are linked or otherwise associated with particular risk signatures, so that those remediation workflows are called when the risk signature is detected. This improves the accuracy in identifying and calling relevant remediation actions and reduces the risk of failed or missed remediations. The present technology improves the performance in security of cloud databases.

One or more implementations of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

Examples discussed herein include processor(s) and/or server(s). For sake of illustration, but not by limitation, the processors and/or servers include computer processors with associated memory and timing circuitry, and are functional parts of the corresponding systems or devices, and facilitate the functionality of the other components or items in those systems.

Also, user interface displays have been discussed. Examples of user interface displays can take a wide variety of forms with different user actuatable input mechanisms. For instance, a user input mechanism can include icons, links, menus, text boxes, check boxes, etc., and can be actuated in a wide variety of different ways. Examples of input devices for actuating the input mechanisms include, but are not limited to, hardware devices (e.g., point and click devices, hardware buttons, switches, a joystick or keyboard, thumb switches or thumb pads, etc.) and virtual devices (e.g., virtual keyboards or other virtual actuators). For instance, a user actuatable input mechanism can be actuated using a touch gesture on a touch sensitive screen. In another example, a user actuatable input mechanism can be actuated using a speech command.

The present figures show a number of blocks with corresponding functionality described herein. It is noted that fewer blocks can be used, such that functionality is performed by fewer components. Also, more blocks can be used with the functionality distributed among more components. Further, the data stores discussed herein can be broken into multiple data stores. All of the data stores can be local to the systems accessing the data stores, all of the data stores can be remote, or some data stores can be local while others can be remote.

As used herein, if a description includes "one or more of" or "at least one of" followed by a list of example features with a conjunction "or" between the penultimate example feature and the last example feature, then this is to be read such that (1) one example includes at least one of or one or more of each feature of the listed features, (2) another example includes at least one of or one or more of only one feature of the listed features, and (3) another example includes some combination of the listed features that is less than all of the features and more than one of the features.

As used herein, if a description includes "one or more of" or "at least one of" followed by a list of example features with a conjunction "and" between the penultimate example feature and the last example feature, then this is to be read such that the example includes at least one of or one or more of each feature of all the listed features.

As used herein, if a description includes "one or more of" or "at least one of" followed by a list of example features with a conjunction "and/or" between the penultimate example feature and the least example feature, then this is to be read such that, in one example, the description includes "one or more of" or "at least one of" followed by a list of example features with a conjunction "or" between the penultimate example feature and the last example feature, and, in another example, the description includes "one or more of" or "at least one of" followed by a list of example features with a conjunction "and" between the penultimate example feature and the last example feature.

The above discussion has described a variety of different systems, components, logic, and interactions. One or more of these systems, components, logic and/or interactions can be implemented by hardware, such as processors, memory, or other processing components. Some particular examples include, but are not limited to, artificial intelligence components, such as neural networks, that perform the functions associated with those systems, components, logic, and/or interactions. In addition, the systems, components, logic and/or interactions can be implemented by software that is loaded into a memory and is executed by a processor, server, or other computing component, as described below. The systems, components, logic and/or interactions can also be implemented by different combinations of hardware, software, firmware, etc., some examples of which are described below. These are some examples of different structures that can be used to implement any or all of the systems, components, logic, and/or interactions described above.

The elements of the described figures, or portions of the elements, can be disposed on a wide variety of different devices. Some of those devices include servers, desktop computers, laptop computers, tablet computers, or other mobile devices, such as palm top computers, cell phones, smart phones, multimedia players, personal digital assistants, etc.

FIG. 17 is a simplified block diagram of one example of a client device 1700, such as a handheld or mobile device, in which the present system (or parts of the present system) can be deployed. FIG. 18 illustrates an example of a handheld or mobile device.

One or more communication links 1702 allows device 1700 to communicate with other computing devices, and can provide a channel for receiving information automatically, such as by scanning. An example includes communication protocols, such as wireless services used to provide cellular access to a network, as well as protocols that provide local wireless connections to networks.

Applications or other data can be received on an external (e.g., removable) storage device or memory that is connected to an interface 1704. Interface 1704 and communication links 1702 communicate with one or more processors 1706 (which can include processors or servers described with respect to the figures) along a communication bus (not shown in FIG. 17), that can also be connected to memory 1708 and input/output (I/O) components 1710, as well as clock 1712 and a location system 1714.

Components 1710 facilitate input and output operations for device 1700, and can include input components such as microphones, touch screens, buttons, touch sensors, optical sensors, proximity sensors, orientation sensors, accelerometers. Components 1710 can include output components such as a display device, a speaker, and or a printer port.

Clock 1712 includes, in one example, a real time clock component that outputs a time and date, and can provide timing functions for processor 1706. Location system 1714 outputs a current geographic location of device 1700 and can includes a global positioning system (GPS) receiver, a LORAN system, a dead reckoning system, a cellular triangulation system, or other positioning system. Memory 1708 stores an operating system 1716, network applications and corresponding configuration settings 1718, communication configuration settings 1720, communication drivers 1722, and can include other items 1724. Examples of memory 1708 include types of tangible volatile and non-volatile computer-readable memory devices. Memory 1708 can also include computer storage media that stores computer readable instructions that, when executed by processor 1706, cause the processor to perform computer-implemented steps or functions according to the instructions. Processor 1706 can be activated by other components to facilitate functionality of those components as well.

FIG. 18 illustrates one example of a tablet computer 1800 having a display screen 1852, such as a touch screen or a stylus or pen-enabled interface. Screen 1802 can also provide a virtual keyboard and/or can be attached to a keyboard or other user input device through a mechanism, such as a wired or wireless link. Alternatively, or in addition, computer 1800 can receive voice inputs.

FIG. 19 shows an example computer system 1900 that can be used to implement the technology disclosed. Computer system 1900 includes at least one central processing unit (CPU) 1972 that communicates with a number of peripheral devices via bus subsystem 1955. These peripheral devices can include a storage subsystem 1910 including, for example, memory devices and a file storage subsystem 1936, user interface input devices 1938, user interface output devices 1976, and a network interface subsystem 1974. The input and output devices allow user interaction with computer system 1900. Network interface subsystem 1974 provides an interface to outside networks, including an interface to corresponding interface devices in other computer systems.

In one implementation, cloud security posture analysis system 1918 is communicably linked to the storage subsystem 1910 and the user interface input devices 1938.

User interface input devices 1938 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1900.

User interface output devices 1976 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1900 to the user or to another machine or computer system.

Storage subsystem 1910 stores programming and data constructs that provide the functionality of some or all of the modules and methods described herein. These software modules are generally executed by processors 1978.

Processors 1978 can be graphics processing units (GPUs), field-programmable gate arrays (FPGAs), application-specific integrated circuits (ASICs), and/or coarse-grained reconfigurable architectures (CGRAs). Processors 1978 can be hosted by a deep learning cloud platform such as Google Cloud Platform™, Xilinx™, and Cirrascale™. Examples of processors 1978 include Google's Tensor Processing Unit (TPU)™, rackmount solutions like GX4 Rackmount Series™, GX50 Rackmount Series™, NVIDIA DGX-1™, Microsoft's Stratix V FPGA™, Graphcore™ Intelligent Processor Unit (IPU)™, Qualcomm's Zeroth Platform™ with Snapdragon Processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 1922 used in the storage subsystem 1910 can include a number of memories including a main random access memory (RAM) 1932 for storage of instructions and data during program execution and a read only memory (ROM) 1934 in which fixed instructions are stored. A file storage subsystem 1936 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1936 in the storage subsystem 1910, or in other machines accessible by the processor.

Bus subsystem 1955 provides a mechanism for letting the various components and subsystems of computer system 1900 communicate with each other as intended. Although bus subsystem 1955 is shown schematically as a single bus, alternative implementations of the bus subsystem can use multiple busses.

Computer system 1900 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1900 depicted in FIG. 19 is intended only as a specific example for purposes of illustrating the preferred implementations of the present invention. Many other configurations of computer system 1900 are possible having more or less components than the computer system depicted in FIG. 19.

It should also be noted that the different examples described herein can be combined in different ways. That is, parts of one or more examples can be combined with parts of one or more other examples. All of this is contemplated herein.

The technology disclosed can be practiced as a system, method, or article of manufacture. One or more features of an implementation can be combined with the base implementation. Implementations that are not mutually exclusive are taught to be combinable.

One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   detecting an event in a cloud environment;
   obtaining a pre-defined risk signature that identifies one or more entities in the cloud environment and represents an instance of a risk event relative to the one or more entities, the pre-defined risk signature comprising a reference to a remediation workflow having one or more commands for one or more remediation actions in the cloud environment, wherein the one or more entities comprise one or more of cloud accounts, compute resources, storage resources, or roles;
   accessing one or more of permissions data or access control data for pairs of compute resources and storage resources in the cloud environment;
   determining that the pre-defined risk signature has a threshold match to the event based on the one or more of permissions data or access control data;
   based on the determining that the pre-defined risk signature has a threshold match to the event, obtaining the remediation workflow based on the reference; and

US 12,652,297 B2

27 executing the one or more commands in the cloud environment.

2. The computer-implemented method of claim 1, and further comprising:

identifying context information based on an infrastructure graph; and executing the remediation workflow with an input condition that is based on the context information.

3. The computer-implemented method of claim 1, wherein the reference comprises a pointer.

4. The computer-implemented method of claim 1, wherein the remediation workflow comprises a metacommand.

5. The computer-implemented method of claim 1, and comprising:

configuring an orchestration engine to deploy an event log scanner to detect the event;

receiving, by the orchestration engine, event metadata representing the event; and executing, by the orchestration engine, the remediation workflow.

6. The computer-implemented method of claim 5, wherein the orchestration engine comprises a control plane backend in the cloud environment.

7. A computing system comprising at least one processor; and memory storing instructions executable by the at least one processor, wherein the instructions, when executed, cause the computing system to:

detect an event in a cloud environment;

obtain a pre-defined risk signature that identifies one or more entities in the cloud environment and represents an instance of a risk event relative to the one or more entities, the pre-defined risk signature comprising a reference to a remediation workflow having one or more commands for one or more remediation actions in the cloud environment, wherein the one or more entities comprise one or more of cloud accounts, compute resources, storage resources, or roles;

access one or more of permissions data or access control data for pairs of compute resources and storage resources in the cloud environment;

determine that the pre-defined risk signature has a threshold match to the event based on the one or more of permissions data or access control data;

based on the determination, obtain the remediation workflow based on the reference; and execute the one or more commands in the cloud environment.

8. The computing system of claim 7, wherein the instructions, when executed, cause the computing system to:

identify context information based on an infrastructure graph; and execute the remediation workflow with an input condition that is based on the context information.

9. The computing system of claim 7, wherein the reference comprises a pointer.

10. The computing system of claim 7, wherein the remediation workflow comprises a metacommand.

11. The computing system of claim 7, wherein the instructions, when executed, cause the computing system to:

configure an orchestration engine to deploy an event log scanner to detect the event;

receive, by the orchestration engine, event metadata representing the event; and

28 execute, by the orchestration engine, the remediation workflow.

12. The computing system of claim 11, wherein the orchestration engine comprises a control plane backend in the cloud environment.

13. A multi-cloud risk event detection and remediation system comprising:

at least one processor; and memory storing instructions executable by the at least one processor, wherein the instructions, when executed, cause the multi-cloud risk event detection and remediation system to provide:

a command library component configured to obtain, from each respective cloud provider of a plurality of cloud providers, a command library that is specific to the respective cloud provider;

a remediation workflow generator component configured to generate, for a selected cloud provider of the plurality of cloud providers, a remediation workflow that includes a set of commands from the command library that is specific to the selected cloud provider;

a risk signature generator component configured to generate a risk signature that identifies one or more entities in a cloud environment of the selected cloud provider and represents an instance of a risk event relative to the one or more entities;

a mapping component configured to generate a mapping between the risk signature and the remediation workflow; and a remedial action component configured to execute the set of commands from the remediation workflow for a detected event in the cloud environment based on the mapping.

14. The multi-cloud risk event detection and remediation system of claim 13, wherein the mapping comprises a reference in the risk signature.

15. The multi-cloud risk event detection and remediation system of claim 14, wherein the reference includes a pointer to the remediation workflow.

16. The multi-cloud risk event detection and remediation system of claim 13, and further comprising a matching component configured to:

determine that the detected event has a threshold match to the risk signature; and obtain the remediation workflow using the mapping.

17. The multi-cloud risk event detection and remediation system of claim 16, wherein the risk signature includes a plurality of elements representing the one or more entities and relationships between the one or more entities, and wherein the matching component is configured to determine that the risk signature has the threshold match to the detected event by identifying, from the detected event, a threshold number of elements from the plurality of elements.

18. The computing system of claim 7, wherein the pre-defined risk signature includes a plurality of elements representing the one or more entities and relationships between the one or more entities, and wherein the instructions cause the computing system to determine that the pre-defined risk signature has the threshold match to the event by identifying, from the event, a threshold number of elements from the plurality of elements.

19. The computer-implemented method of claim 1, and further comprising:

obtaining a command library that is specific to a cloud provider of the cloud environment; and generating the remediation workflow that includes a set of commands from the command library.

20. The computer-implemented method of claim 1, wherein the pre-defined risk signature includes a plurality of elements representing the one or more entities and relationships between the one or more entities, and wherein determining that the pre-defined risk signature has the threshold match to the event comprises identifying, from the event, a threshold number of elements from the plurality of elements.

\* \* \* \* \*